US010224577B2

(12) United States Patent
Bhavaraju et al.

(10) Patent No.: US 10,224,577 B2
(45) Date of Patent: Mar. 5, 2019

(54) BATTERY CHARGE TRANSFER MECHANISMS

(71) Applicant: Field Upgrading USA, Inc., Madison, WI (US)

(72) Inventors: Sai Bhavaraju, West Jordan, UT (US); Mathew Robins, Saratoga Springs, UT (US); Chett Boxley, Park City, UT (US)

(73) Assignee: FIELD UPGRADING USA, INC., Denver, CO (US)

( * ) Notice: Subject to any disclaimer, the term of this patent is extended or adjusted under 35 U.S.C. 154(b) by 249 days.

(21) Appl. No.: 14/040,241

(22) Filed: Sep. 27, 2013

(65) Prior Publication Data
US 2014/0030571 A1 Jan. 30, 2014

Related U.S. Application Data

(63) Continuation-in-part of application No. 13/290,716, filed on Nov. 7, 2011, now Pat. No. 8,968,902.

(60) Provisional application No. 61/707,239, filed on Sep. 28, 2012.

(51) Int. Cl.
*H01M 10/00* (2006.01)
*H01M 10/42* (2006.01)
*H01B 1/12* (2006.01)
*H01M 4/38* (2006.01)
*H01M 10/054* (2010.01)
*H01M 10/0562* (2010.01)
*H01M 4/36* (2006.01)
*H01M 4/58* (2010.01)
*H01M 4/62* (2006.01)
*H01M 10/39* (2006.01)

(52) U.S. Cl.
CPC ........ *H01M 10/4235* (2013.01); *H01B 1/122* (2013.01); *H01M 4/368* (2013.01); *H01M 4/381* (2013.01); *H01M 4/58* (2013.01); *H01M 4/62* (2013.01); *H01M 10/054* (2013.01); *H01M 10/0562* (2013.01); *H01M 10/39* (2013.01); *H01M 10/3954* (2013.01); *H01M 2300/002* (2013.01); *H01M 2300/0094* (2013.01)

(58) Field of Classification Search
CPC ............. H01M 4/0416; H01M 4/0452; H01M 10/4235; H01M 4/62; H01M 4/58; H01M 4/368; H01M 10/39; H01M 10/0562; H01M 10/054; H01M 4/381; H01M 10/3954; H01M 2300/0094; H01M 2300/002; H01B 1/122
USPC ....................................................... 205/334
See application file for complete search history.

(56) References Cited

U.S. PATENT DOCUMENTS

| | | | |
|---|---|---|---|
| 3,546,021 A | 12/1970 | Gale | |
| 3,847,667 A | 11/1974 | Werth | |
| 3,969,138 A | 7/1976 | Werth et al. | |
| 4,020,246 A | 4/1977 | Seo et al. | |
| 4,064,325 A | 12/1977 | Grenness | |
| 4,162,351 A | 7/1979 | Putt et al. | |
| 4,244,986 A | 1/1981 | Paruso et al. | |
| 4,307,164 A | 12/1981 | Church et al. | |
| 4,335,191 A | 6/1982 | Peled | |
| 4,375,501 A | 3/1983 | Peled et al. | |
| 4,427,747 A * | 1/1984 | Bennett ................. | H01M 10/36 429/101 |
| 4,465,744 A | 8/1984 | Susman et al. | |
| 4,485,154 A | 11/1984 | Remick et al. | |
| 4,546,055 A | 10/1985 | Coetzer et al. | |
| 4,579,796 A | 4/1986 | Muramatsu | |
| 4,684,590 A * | 8/1987 | Sammells ............... | H01M 4/13 429/201 |
| 4,753,858 A | 6/1988 | Jow et al. | |
| 4,891,281 A | 1/1990 | Kuo et al. | |
| 4,894,298 A | 1/1990 | Vukson et al. | |
| 4,973,534 A | 11/1990 | Adendorff et al. | |
| 5,019,466 A | 5/1991 | Coetzer et al. | |
| 5,051,325 A | 9/1991 | Shishikura et al. | |

(Continued)

FOREIGN PATENT DOCUMENTS

| | | |
|---|---|---|
| EP | 2 490 293 A1 | 8/2012 |
| EP | 2935655 | 10/2015 |

(Continued)

OTHER PUBLICATIONS

Young, Lee W., "International Search Report", PCT Search Report for App. No. PCT/US 08/10435, (dated Nov. 25, 2008),1-2.

(Continued)

*Primary Examiner* — Nicholas P D'Aniello
(74) *Attorney, Agent, or Firm* — Foley & Lardner LLP

(57) ABSTRACT

The present invention provides a secondary cell having a negative electrode compartment and a positive electrode compartment, which are separated by an alkali ion conductive electrolyte membrane. An alkali metal negative electrode disposed in the negative electrode compartment oxidizes to release alkali ions as the cell discharges and reduces the alkali ions to alkali metal during recharge. The positive electrode compartment includes a positive electrode contacting a positive electrode solution that includes an alkali metal compound and a metal halide. The alkali metal compound can be selected from an alkali halide and an alkali pseudo-halide. During discharge, the metal ion reduces to form metal plating on the positive electrode. As the cell charges, the metal plating oxidizes to strip the metal plating to form metal halide or pseudo halide or corresponding metal complex.

12 Claims, 26 Drawing Sheets

(56) References Cited

U.S. PATENT DOCUMENTS

| | | | |
|---|---|---|---|
| 5,053,294 A | 10/1991 | Sernka et al. | |
| 5,139,897 A | 8/1992 | Wedlake | |
| 5,264,298 A | 11/1993 | Townsend | |
| 5,290,405 A | 3/1994 | Joshi et al. | |
| 5,422,197 A | 6/1995 | Zito | |
| 5,525,442 A | 6/1996 | Shuster | |
| 5,552,244 A | 9/1996 | Griffin et al. | |
| 5,563,006 A | 10/1996 | Von Benda et al. | |
| 5,604,053 A | 2/1997 | Coetzer et al. | |
| 5,648,183 A | 7/1997 | Licht et al. | |
| 5,686,201 A | 11/1997 | Chu | |
| 6,007,943 A | 12/1999 | Coetzer | |
| 6,030,720 A | 2/2000 | Chu et al. | |
| 6,033,343 A | 3/2000 | Licht | |
| 6,033,796 A | 3/2000 | Baji | |
| 6,187,479 B1 | 2/2001 | Liu | |
| 6,270,923 B1 | 8/2001 | Bito et al. | |
| 6,376,123 B1 | 4/2002 | Chu | |
| 6,410,181 B1 | 6/2002 | Spillman et al. | |
| 6,852,450 B2 | 2/2005 | Hwang et al. | |
| 6,881,234 B2 | 4/2005 | Towsley | |
| 7,273,680 B2 | 9/2007 | Durkot | |
| 7,314,681 B2 | 1/2008 | Randell et al. | |
| 7,632,604 B2 | 12/2009 | Lacovangelo et al. | |
| 8,012,621 B2 | 9/2011 | Joshi et al. | |
| 8,168,321 B2 | 5/2012 | Shelekhin et al. | |
| 8,883,339 B2 | 11/2014 | Choi | |
| 8,968,902 B2 | 3/2015 | Coors et al. | |
| 9,431,681 B2 * | 8/2016 | Joshi | H01M 10/3909 |
| 9,537,179 B2 * | 1/2017 | Bhavaraju | H01M 10/399 |
| 9,553,337 B2 * | 1/2017 | Chae | H01M 10/399 |
| 9,876,253 B2 * | 1/2018 | Bhavaraju | H01M 10/054 |
| 2002/0150818 A1 | 10/2002 | Amatucci et al. | |
| 2002/0172871 A1 | 11/2002 | Schucker | |
| 2002/0192553 A1 | 12/2002 | Barker et al. | |
| 2003/0013021 A1 | 1/2003 | Wariishi | |
| 2004/0065543 A1 * | 4/2004 | Kovarsky | C25D 7/12 |
| | | | 204/245 |
| 2005/0016857 A1 * | 1/2005 | Kovarsky | C25D 21/14 |
| | | | 205/98 |
| 2005/0109617 A1 | 5/2005 | Ono et al. | |
| 2005/0260460 A1 | 11/2005 | Kishi et al. | |
| 2006/0141346 A1 | 6/2006 | Gordon et al. | |
| 2006/0177732 A1 | 8/2006 | Visco et al. | |
| 2006/0226022 A1 | 10/2006 | Balagopal et al. | |
| 2006/0257734 A1 | 11/2006 | Obata et al. | |
| 2007/0048610 A1 | 3/2007 | Tsang et al. | |
| 2007/0154762 A1 | 7/2007 | Schucker | |
| 2007/0221265 A1 | 9/2007 | Affinito et al. | |
| 2008/0268327 A1 | 10/2008 | Gordon et al. | |
| 2009/0134040 A1 * | 5/2009 | Gordon | C25B 1/00 |
| | | | 205/560 |
| 2009/0134842 A1 | 5/2009 | Joshi et al. | |
| 2009/0136830 A1 | 5/2009 | Gordon | |
| 2009/0189567 A1 | 6/2009 | Joshi et al. | |
| 2009/0212747 A1 | 8/2009 | Hagiwara et al. | |
| 2010/0044241 A1 * | 2/2010 | Pendleton | C25B 1/46 |
| | | | 205/500 |
| 2010/0089762 A1 * | 4/2010 | Gordon | C25B 1/00 |
| | | | 205/554 |
| 2010/0239893 A1 | 9/2010 | Gordon et al. | |
| 2010/0261051 A1 | 10/2010 | Okada et al. | |
| 2010/0279174 A1 | 11/2010 | Young | |
| 2010/0285372 A1 | 11/2010 | Lee et al. | |
| 2010/0297537 A1 | 11/2010 | Coors et al. | |
| 2011/0104526 A1 * | 5/2011 | Boxley | H01M 2/1646 |
| | | | 429/50 |
| 2011/0104570 A1 | 5/2011 | Galloway et al. | |
| 2011/0199042 A1 | 8/2011 | Abe | |
| 2011/0223460 A1 | 9/2011 | Farmer | |
| 2012/0015256 A1 | 1/2012 | Komaba et al. | |
| 2012/0021273 A1 | 1/2012 | Ohmori et al. | |
| 2012/0045695 A1 | 2/2012 | Sheem et al. | |
| 2012/0126752 A1 | 5/2012 | Joshi et al. | |
| 2012/0129056 A1 | 5/2012 | Majima et al. | |
| 2012/0141856 A1 | 6/2012 | Gordon et al. | |
| 2012/0164524 A1 | 6/2012 | Bogdan et al. | |
| 2012/0214043 A1 | 8/2012 | Olschimke et al. | |
| 2012/0219833 A1 | 8/2012 | Coors et al. | |
| 2012/0219838 A1 | 8/2012 | Coors et al. | |
| 2012/0219843 A1 | 8/2012 | Bogdan et al. | |
| 2012/0315548 A1 | 12/2012 | Fujikawa et al. | |
| 2013/0052525 A1 | 2/2013 | Kageura et al. | |
| 2013/0130085 A1 | 5/2013 | Choi | |
| 2013/0196224 A1 | 8/2013 | Kim et al. | |
| 2014/0170443 A1 | 6/2014 | Bhavaraju et al. | |
| 2014/0210422 A1 | 7/2014 | Bhavaraju et al. | |
| 2014/0212707 A1 | 7/2014 | Bhavaraju et al. | |
| 2015/0086826 A1 | 3/2015 | Bhavaraju et al. | |

FOREIGN PATENT DOCUMENTS

| | | |
|---|---|---|
| EP | 2973832 | 1/2016 |
| FR | 2301108 | 9/1976 |
| FR | 2518320 | 6/1983 |
| GB | 21599661 | 12/1985 |
| GB | 2 244 594 A | 12/1991 |
| GB | 2 294 803 A | 5/1996 |
| JP | 56-096464 A | 8/1981 |
| JP | S56-096464 A | 8/1981 |
| JP | S59-128778 A | 7/1984 |
| JP | S60-054180 A | 3/1985 |
| JP | 62186470 | 8/1987 |
| JP | H04-230963 | 8/1992 |
| JP | H04-249869 A | 9/1992 |
| JP | 08-321322 A | 12/1996 |
| JP | 10162807 | 6/1998 |
| JP | 2001-043854 A | 2/2001 |
| JP | 2003-272616 A | 9/2003 |
| JP | 2004-178991 A | 6/2004 |
| JP | 2008293678 | 12/2008 |
| JP | 2008300173 | 12/2008 |
| JP | 2009-009933 A | 1/2009 |
| JP | 201181971 | 4/2011 |
| JP | 2011-159596 | 8/2011 |
| JP | 2013-048077 A | 3/2013 |
| JP | 2016-516274 A | 6/2016 |
| JP | 2016-516275 A | 6/2016 |
| KR | 20100027321 A | 3/2010 |
| KR | 20130098236 A | 9/2013 |
| WO | WO2012061823 | 8/1992 |
| WO | WO9416468 | 7/1994 |
| WO | WO-2010/110465 A1 | 9/2010 |
| WO | WO-2010/135283 A2 | 11/2010 |
| WO | WO-2011/011566 A1 | 9/2011 |
| WO | WO-2011/104805 A1 | 9/2011 |
| WO | WO-2011/111566 A1 | 9/2011 |
| WO | WO-2012/114951 A1 | 8/2012 |
| WO | WO-2012/115786 A1 | 8/2012 |
| WO | WO-2012/117916 A1 | 9/2012 |
| WO | WO-2012/132813 A1 | 10/2012 |
| WO | WO2013154349 | 10/2013 |
| WO | WO-2014/164883 A1 | 10/2014 |
| WO | WO2014159542 | 10/2014 |

OTHER PUBLICATIONS

Young, Lee W., "Written Opinion of the International Searching Authority", PCT Written Opinion for App. No. PCT/US 08/10435, (dated Nov. 25, 2008),1-4.

Salminen, Justin et al., "Ionic liquids for rechargeable lithium batteries", *Lawrence Berkeley National Laboratory*, (Sep. 21),1-19.

Cullen, Sean P., "Office Action for U.S. Appl. No. 12/205,759", (dated Sep. 16, 2010),1-22.

Cullen, Sean P., "Office Action for U.S. Appl. No. 12/205,759", (dated Apr. 13, 2011),1-15.

Lee, Kang Young "International Search Report", International App. No. PCT/US2010/055718, (dated Jun. 21, 2011),1-3.

Lee, Kang Young "Written Opinion", International App. No. PCT/US2010/055718, (dated Jun. 21, 2011),1-3.

(56) References Cited

OTHER PUBLICATIONS

Suzuki, et al., "Bibliographical Data and Abstract (English Language)", Japanese Patent application JP62-186470, (dated Aug. 14, 1987),1-2.
Yun, Cho K., "Internationial Search Report", PCT App. No. PCT/US2012/036959 (corresponding to U.S. Appl. No. 13/466,844), (dated Nov. 23, 2012),1-3.
Yun, Cho K., "Written Opinion of the International Searching Authority", PCT App. No. PCT/US2012/036959 (corresponding to U.S. Appl. No. 13/466,844), (dated Nov. 23, 2012),1-5.
Cullen, Sean P., "Non Final Office Action", U.S. Appl. No. 12/205,759, (dated Apr. 5, 2013),1-17.
Lee, Dong W., "International Serach Report", PCT Application No. PCT/US13/68552 (Corresponding to U.S. Appl. No. 14/072,468), (dated Jan. 24, 2014),1-3.
Lee, Dong W., "Written Opinion of the International Searching Authority", PCT Application No. PCT/US2013/68552 (Corresponding to U.S. Appl. No. 14/072,468), (dated Jan. 24, 2014),1-5.
Lee, Dong W., "International Search Report", PCT Application No. PCT/US13/62386 (Corresponding to U.S. Appl. No. 14/040,241), (dated Dec. 23, 2013),1-3.
Lee, Dong W., "Written Opinion of the International Search Authority", PCT Application No. PCT/US2013/62386 (Corresponding to U.S. Appl. No. 14/040,241), (dated Dec. 23, 2014),1-5.
Lee, Dong W., "International Search Report", PCT Application No. PCT/US2013/058403 (Corresponding to U.S. Appl. No. 14/019,651), (dated Dec. 2, 2013),1-3.
Lee, Dong W., "Written Opinion of the International Searching Authority", PCT Application No. PCT/US2013/058403 (Corresponding to U.S. Appl. No. 14/019,651), (dated Dec. 2, 2013),1-6.
Parsons, Thomas H., "Non Final Office Action", U.S. Appl. No. 13/466,844, (dated Feb. 26, 2015),1-22.
Marks, Jacob B., "Non Final Office Action", U.S. Appl. No. 14/469,865, (dated Apr. 7, 2015),1-6.
Shin, Ju C., "International Search Report", PCT Application No. PCT/US2014/059954 (Corresponding with U.S. Appl. No. 14/511,031), (Jan. 20, 2015),1-3.
Shin, Ju C., "Written Opinion of the International Searching Authority", PCT Application No. PCT/US2014/059954 (Corresponding with U.S. Appl. No. 14/511,031), (dated Jan. 20, 2015),1-4.
Jarvi, Tommi "Supplementary European Search Report", European Patent Application No. 12783042.0, (dated Oct. 14, 2014),1-7.
Takeguchi, Yasuhiro "Final Rejection Action", Japanese Patent Application No. 2012-537241, (dated Jun. 17, 2014),1-6.
"Notice of Allowance", Japanese Patent Application 2012-537241), (dated May 11, 2015),1-6.
Parsons, Thomas H., "Final Office Action", U.S. Appl. No. 13/466,844, (dated Aug. 11, 2015),1-13.
Masatsugu, Morimitsu "English Lanuage Abstract", JP2008293678, (Dec. 4, 2008),1.
Peramunage, et al., "A Solid Sulfur Cathode for Aqueous Batteries", *Science*, vol. 261, (Aug. 20, 1993),1029-1032.
Marks, Jacob B., "Non-Final Office Action", U.S. Appl. No. 12/940,864, (dated Jun. 18, 2013),1-30.
Marks, Jacob B., "Final Office Action", U.S. Appl. No. 12/940,864, (dated Jan. 29, 2014),1-11.
Marks, Jacob B., "Notice of Allowance", U.S. Appl. No. 12/940,864, (dated Jun. 20, 2014),1-7.
Cain, Edward J., "Non Final Office Action", U.S. Appl. No. 14/072,468, (dated Oct. 5, 2015),1-6.
Quraishi, Kiran "Non-Final Office Action", U.S. Appl. No. 14/040,241, (dated Oct. 28, 2015),1-12.
Colucci, Rios J., "Non-Final Office Action", U.S. Appl. No. 14/019,651, (dated Aug. 17, 2015),1-26.
Akhtar, Kiran Q., "Final Office Action", U.S. Appl. No. 14/040,241, dated May 18, 2016, 1-19.
Cain, Edward J., "Notice of Allowance", U.S. Appl. No. 14/072,468, dated Apr. 28, 2016, 1.7.
Coetzer, et al., "English Translation", FR2518320, Jun. 17, 1983.
Colucci Rios, Jose A., "Final Office Action", U.S. Appl. No. 14/019,651, dated Dec. 17, 2015, 1-30.
Colucci Rios, Jose A., "Non Final Office Action", U.S. Appl. No. 14/511,031, dated Apr. 12, 2016, 1-15.
Colucci Rios, Jose A, "Notice of Allowance", U.S. Appl. No. 14/019,651, dated Mar. 31, 2016, 1-7.
Dunn, Halina, "European Search Report", European Patent Application No. 13834937.8 (Corresponding to U.S. Appl. No. 14/019,651), dated Mar. 18, 2016, 1-7.
Grenness, Morten, "US Publication of", FR2301108, Dec. 20, 1977, 1-8.
Jarvi, Tommi, "European Examination Report", European Patent Application No. 12783042.0, dated Mar. 1, 2016, 1-8.
Kelly, Michael, "European Search Report", European Patent Application No. 13865228.4, dated Jul. 15, 2016, 1-7.
Kim, Yeon K., "International Search Report", PCT Application No. PCT/US2015/063244, dated Mar. 18, 2016, 1-3.
Kim, Yeon K., "Written Opinion of the International Searching Authority", PCT Application No. PCT/US2015/63244, dated Mar. 18, 2016, 1-3.
"English Translation", JP 2011-81971, 1-6.
"English Translation", JP 2008-300173, 1-8.
Masson, Jean-Pierre, "European Search Report", European Patent Application No. 13842649.9, dated Apr. 26, 2016, 1-8.
Parsons, Thomas H., "Non Final Office Action", U.S. Appl. No. 13/466,844, dated Oct. 7, 2016, 1-13.
Parsons, Thomas H., "Non Final Office Action", U.S. Appl. No. 13/466,844, dated Mar. 23, 2016, 1-15.
Tsuji, Hirosuke, "Final Office Action", Japanese Patent Application No. 2014-510410 (Japanese Version), dated Apr. 5, 2016, 1-4.
Tsuji, Hirosuke, "Final Office Action", Japanese Patent Application No. 2014-510410 (English Translation), dated Apr. 5, 2016, 1-6.
Tsuji, Hirosuke, "Non-Final Office Action", Japanese Patent Application No. 2014-510410 (English Translation), dated Nov. 10, 2015, 1-15.
Tsuji, Hirosuke, "Non-Final Office Action", Japanese Patent Application No. 2014-510410 (Japanese Version), dated Nov. 10, 2015, 1-8.
Unknown, , "Notice of Allowance", Japanese Patent Application No. 2014-510410, dated Aug. 9, 2016, 1-4.
Zhang, et al., "A Reveiw of the Electrochemical Performance of Alloy Anodes for Lithium-ion Batteries", Journal of Power Sources, Elsevier SA, CH, vol. 196, No. 1, Jan. 1, 2011, 13-24.
Akhtar, Kiran Q., "Final Office Action", U.S. Appl. No. 14/511,031, dated Nov. 3, 2016, 1-12.
Gotz, Heide, "European Search Report", European Patent Application No. EP10829189.9, dated Nov. 18, 2016, 1-7.
Parsons, Thomas, "Non Final Office Action", U.S. Appl. No. 13/466,844, dated May 19, 2017, 1-10.
Unknown, , "Examination Report", Australian Patent Application No. 2013364191, dated Apr. 4, 2017, 1-3.
Communication pursuant to Article 94(3) EPC for EP Application No. 14774153.2 dated Jan. 18, 2018 (5 pages).
Communication pursuant to Article 94(3) EPC for EP Application No. 14779822.7 dated Jan. 18, 2018 (5 pages).
Extended European Search Report in EP Application No. 14774153.2 dated Sep. 9, 2016 (12 pages).
Final Rejection Office Action in U.S. Appl. No. 14/205,772 dated Feb. 9, 2017 (15 pages).
Final Rejection Office Action in U.S. Appl. No. 14/205,019 dated Jan. 26, 2017 (21 pages).
Final Rejection Office Action in U.S. Appl. No. 14/298,302 dated May 9, 2016 (17 pages).
Hueso, et al., "High Temperature Sodium Batteries: Status, challenges and future trends," Energy & Environmental Science, 2013, pp. 734-749, vol. 6.
International Search Report and Written Opinion in International Application No. PCT/US2011/059624 dated May 22, 2012 (6 pages).
International Search Report in International Application No. PCT/US2014/057462 dated Jan. 9, 2015 (3 pages).
International Search Report in International Application No. PCT/US2011/059624 dated May 22, 2012 (3 pages).

(56) References Cited

OTHER PUBLICATIONS

International Search Report in International Application No. PCT/US2014/023698 dated Jul. 29, 2014 (3 pages).
International Search Report in International Application No. PCT/US2014/024066 dated Jun. 27, 2014 (3 pages).
International Search Report in International Application No. PCT/US2014/040297 dated Sep. 25, 2014 (3 pages).
International Search Report in International Application No. PCT/US2014/041329 dated Oct. 2, 2014 (3 pages).
International Search Report in International Application No. PCT/US2014/054339 dated Dec. 15, 2014 (3 pages).
International Search Report in International Application No. PCT/US2016/027930 dated Jul. 26, 2016 (3 pages).
Kim, et al., "The Role of Additives in the Electroreduction of Sodium Ions in Chloroaluminate-Based Ionic Liquids," Journal of the Electrochemical Society. 2005, pp. E9-E13, vol. 152 No. 1.
Lang, et al., "Catalytic additives for the reversible reduction of sodium in chloroaluminate ionic liquids", Electrochimica Acta, 2006, pp. 3884-3889, vol. 51, Issue 19.
Li, et al., "Rechargeable Ni-Li Battery Integrated Aqueous/Non Aqueous System," Journal of the American Chemical Society, 2009, pp. 15098-15099, vol. 131, Issue 42.
Non Final Rejection Office Action in U.S. Appl. No. 14/205,019 dated Jul. 15, 2016 (22 pages).
Non-Final Rejection Office Action in U.S. Appl. No. 13/290,716 dated Jul. 22, 2014 (15 pages).
Non-Final Rejection Office Action in U.S. Appl. No. 14/205,772 dated Jul. 5, 2016 (21 pages).
Non-Final Rejection Office Action in U.S. Appl. No. 14/292,130 dated Dec. 8, 2015 (9 pages).
Non-Final Rejection Office Action in U.S. Appl. No. 14/298,302 dated Apr. 6, 2017 (13 pages).
Non-Final Rejection Office Action in U.S. Appl. No. 14/298,302 dated Nov. 18, 2015 (19 pages).
Non-Final Rejection Office Action on U.S. Appl. No. 14/205,019 dated Jun. 22, 2017 (19 pages).
Non-Final Rejection on U.S. Appl. No. 14/205,772 dated Jun. 19, 2017 (14 pages).
Notice of Allowance in U.S. Appl. No. 13/290,716 dated Oct. 29, 2014 (8 pages).
Notice of Allowance in U.S. Appl. No. 14/205,019 dated Apr. 19, 2018 (5 pages).
Notice of Allowance in U.S. Appl. No. 14/205,772 dated Apr. 10, 2018 (5 pages).
Notice of Allowance in U.S. Appl. No. 14/292,130 dated May 5, 2016 (13 pages).
Notice of Allowance in U.S. Appl. No. 14/478,676 dated May 9, 2016 (15 pages).
Notice of Allowance in U.S. Appl. No. 14/496,509 dated Aug. 24, 2016 (15 pages).
Notice of Allowance on U.S. Appl. No. 14/205,019 dated Mar. 28, 2018 (8 pages).
Notice of Allowance on U.S. Appl. No. 14/205,772 dated Mar. 13, 2018 (8 pages).
Notice of Reason for Rejection in JP Application No. 2015-534766 dated Apr. 4, 2017 (with English translation) (8 pages).
Notice of Reason for Rejection in JP Application No. 2016-501410 dated Sep. 5, 2017 (with English translation) (12 pages).
Notice of Reasons for Rejection in JP Application No. 2013-537914 dated Sep. 8, 2015 (with English translation) (8 pages).
Notification of Reasons for Refusal in JP Application No. 2013-537914 dated May 31, 2016 (with English translation) (6 pages).
Notification of Reasons for Refusal in JP Application No. 2016-501320 dated Sep. 5, 2017 (with English Translation) (9 pages).
Notification of Reasons for Refusal in JP Application No. 2016-501410 dated Sep. 5, 2017 (with English translation (7 pages).
Sudworth, "The sodium/nickel chloride (ZEBRA) battery," Journal of Power Sources, Nov. 30, 2001, pp. 149-163, vol. 100, Issues 1-2.
Wang, et al., "Room temperature Na/S batteries with sulfur composite cathode materials," Electrochemistry Communications, 2007, pp. 31-34. vol. 9.
Written Opinion of the International Searching Authority in International Application No. PCT/US2011/059624 dated May 22, 2012 (3 pages).
Written Opinion of the International Searching Authority in International Application No. PCT/US2016/027930 dated Jul. 26, 2016 (5 pages).
Written Opinion of the International Searching Authority in International Application No. PCT/US2014/023698 dated Jul. 29, 2014 (13 pages).
Written Opinion of the International Searching Authority in International Application No. PCT/US2014/024066 dated Jun. 27, 2014 (6 pages).
Written Opinion of the International Searching Authority in International Application No. PCT/US2014/040297 dated Sep. 25, 2014 (6 pages).
Written Opinion of the International Searching Authority in International Application No. PCT/US2014/041329 dated Oct. 2, 2014 (6 pages).
Written Opinion of the International Searching Authority in International Application No. PCT/US2014/054339 dated Dec. 15, 2014 (3 pages).
Written Opinion of the International Searching Authority in International Application No. PCT/US2014/57462 dated Jan. 9, 2015 (4 pages).
Notice of Reasons for Rejection in JP2016-501320 dated Jun. 26, 2018, with English translation (6 pages).
Notice of Reasons for Rejection in JP2016-501410 dated Jun. 26, 2018, with English translation (6 pages).

\* cited by examiner # BATTERY CHARGE TRANSFER MECHANISMS

RELATED APPLICATIONS

This application claims priority to U.S. Provisional Patent No. 61/707,239 filed on Sep. 28, 2012 and titled BATTERY CHARGE TRANSFER MECHANISMS. This application is also a continuation-in-part and claims priority to U.S. application Ser. No. 13/290,716 filed Nov. 7, 2011 and titled LOW TEMPERATURE MOLTEN SODIUM SECONDARY CELL WITH SODIUM ION CONDUCTIVE ELECTROLYTE MEMBRANE which application claimed priority to U.S. Application No. 61/410,812 filed on Nov. 5, 2010.

FIELD OF THE INVENTION

The present invention relates to alkali metal secondary cells. More particularly, the present invention discloses systems and methods for providing battery charge transfer mechanisms that allow metal plating to form on a battery's positive electrode as the battery discharges, and that also allow the metal plating to go into solution as the battery charges.

BACKGROUND OF THE INVENTION

Electrolytic cells comprising a solid alkali ion conductive electrolyte membrane that selectively transports alkali ions are known in the art. By having an alkali ion-selective membrane in the electrolytic cell, alkali ions are allowed to pass between the cell's anolyte compartment and catholyte compartment while other chemicals are maintained in their original compartments. Thus, through the use of an alkali ion-specific membrane, an electrolytic cell can be engineered to be more efficient and to produce different chemical reactions than would otherwise occur without the membrane.

Solid alkali ion conductive electrolyte membranes are used in electrochemical cells for various reasons, including, but not limited to, being: ion conductive, ion selective, water impermeable, chemically stable, electronically insulative, and so forth. By way of example, NaSICON (Na Super Ion CONducting) membranes selectively transport sodium cations, while LiSICON (Li Super Ion CONducting) and KSICON (K Super Ion CONducting) membranes selectively transport lithium and potassium cations, respectively. Other examples of solid alkali ion conductive electrolyte membranes include beta alumina, sodium-conductive glasses, etc.

Electrolytic cells comprising solid alkali ion conductive membranes are used to produce a variety of different chemicals and to perform various chemical processes. In some cases, however, such cells are used as batteries that can store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolyte(s), which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

Rechargeable batteries based on sodium or lithium can employ a solid primary electrolyte separator, such as a solid alkali ion conductive electrolyte membrane (discussed above). The principal advantage of using a solid ion conductive electrolyte membrane is that the Faradaic efficiency of the resulting cell approaches 100%. Indeed, in many other cell designs, the electrode solutions in the cell are able to intermix over time and, thereby, cause a drop in Faradaic efficiency and loss of battery capacity.

In some cases, the sodium or lithium negative electrode in sodium or lithium-based rechargeable batteries is molten. In such cases, the batteries may need to be operated at temperatures above about 100° C. Furthermore, some conventional sodium and lithium-based batteries comprise a catholyte change transfer mechanism using a solution (e.g., NaOH) that has a relatively high pH or that is otherwise chemically reactive to the alkali ion conductive electrolyte membrane. As a result of the high operating temperatures and the chemically reactive catholyte solutions, the solid alkali ion conductive electrolyte membrane of some conventional sodium and lithium-based batteries is relatively susceptible to degradation by dissolution. Accordingly, the useful life of such batteries may be relatively short.

Thus, while sodium and lithium-based rechargeable batteries are known, challenges still exist, including those mentioned above. Accordingly, it would be an improvement in the art to augment or even replace certain conventional sodium and lithium-based rechargeable cells with other battery charge transfer mechanisms.

BRIEF SUMMARY OF THE INVENTION

The present invention provides systems and methods for providing battery charge transfer mechanisms that allow metal plating to form on a rechargeable battery's positive electrode as the battery discharges and that also allow the metal plating to go into solution as the battery charges. In some non-limiting implementations, the battery includes a secondary cell having a negative electrode compartment and a positive electrode compartment, which are separated by an alkali ion conductive electrolyte membrane. In some non-limiting implementations, an alkali metal negative electrode made of sodium or lithium is disposed in the negative electrode compartment. In this regard, as the cell discharges, the negative anode oxidizes to release alkali ions (e.g., $Na^+$ or $Li^+$). In contrast, as the cell is recharged the alkali ions are reduced to form the corresponding alkali metal.

In some non-limiting implementations, the positive electrode compartment includes a positive electrode that is in contact with a liquid positive electrode solution. While the positive electrode solution can comprise any suitable component that allows the cell to be charged and discharged in the described manner, in some implementations, the solution includes an alkali metal halide or pseudohalide and a metal halide or pseudohalide. In some cases, the alkali metal compound is further selected from an alkali metal halide and an alkali metal pseudo-halide. Moreover, in some cases, the metal halide or pseudohalide is in the form of a metal complex including a plurality of halide and pseudo-halide ions. Accordingly, as the cell discharges, the metal ion from the metal halide or metal complex reduces to form metal plating on the positive electrode. In contrast, as the cell charges, the metal plating oxidizes to release the metal ion back into the positive electrode solution.

Some non-limiting examples of metal ions in the metal halide and pseudo-halide or metal complex can include ions of silver, aluminum, gold, bismuth, beryllium, cobalt, cadmium, chromium, copper, iron, zinc, gallium, mercury, magnesium, manganese, nickel, lead, titanium, vanadium, zirconium, niobium, molybdenum, tungsten, gallium, indium, and tin. Additionally, some examples of halide ions (e.g., for the metal complex and the alkali metal compound) may include one or more halide ions selected from fluoride, chloride, bromide, and iodide. Moreover, some examples of pseudo-halide ions (e.g., for the metal complex and the alkali metal compound) may include one or more ions selected from azide, thiocyanate, cyanide, and other known pseudo-halide ions.

The solid alkali ion conductive electrolyte membrane material may include, but is not limited to, an alkali Metal Super Ion Conductive (MeSICON) material, where "Me" represents an alkali metal. Non-limiting examples of MeSICON materials include ceramic NaSICON, NaSICON-type materials, LiSICON, and LiSICON-type materials.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which:

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are given, such as examples of suitable electrolytic cells and their features, metal complexes, alkali metal compounds, halide or pseudo-halide ions, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As understood by persons skilled in the art, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged," and "rechargeable" shall be interchangeable with the terms "charge," "charged," and "chargeable" respectively.

Figure 1:
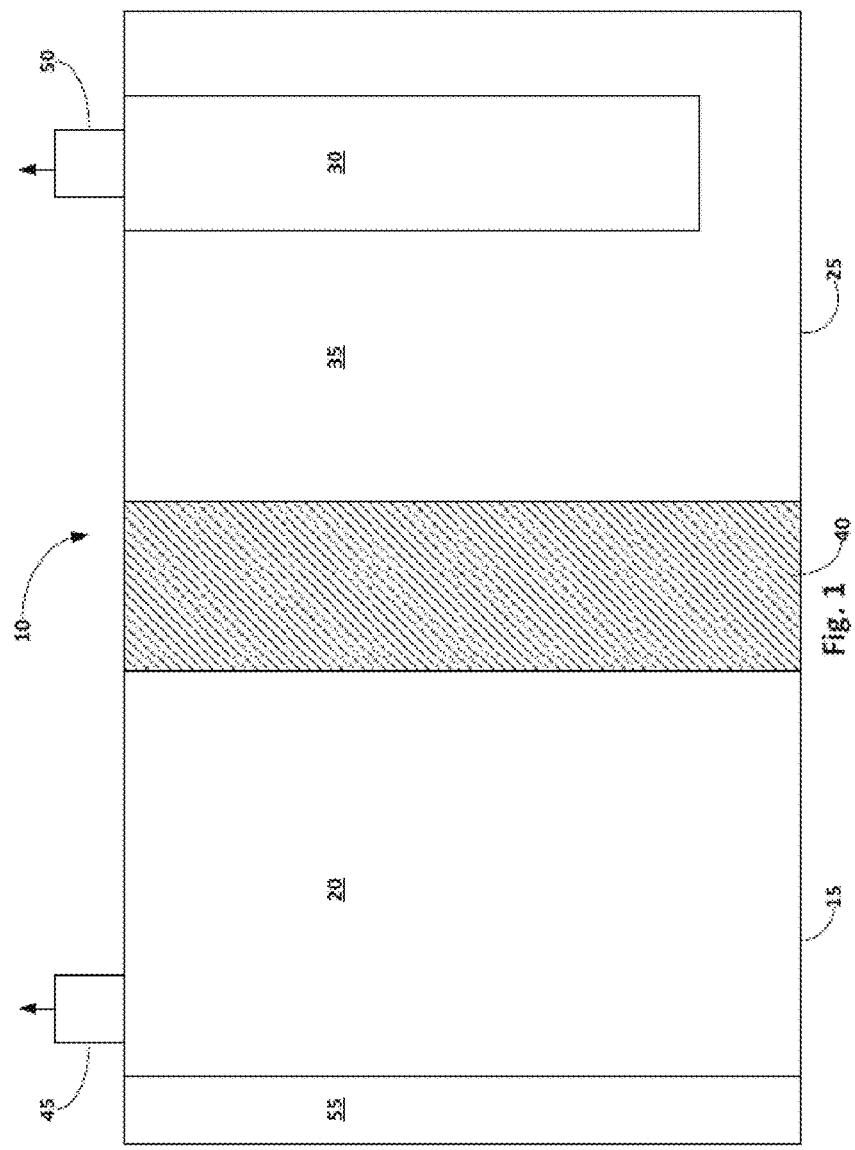
FIG. 1 depicts a schematic diagram of a representative embodiment of a secondary cell.

The disclosed invention provides systems and methods for providing battery charge transfer mechanisms that allow metal plating to form on a positive electrode in a rechargeable battery as the battery discharges, and that further allow the metal plating to oxidize and go into solution as the battery charges. While the described battery can comprise any suitable component, FIG. 1 shows a representative embodiment in which the rechargeable battery (or cell) 10 comprises a negative electrode compartment 15 (which includes an alkali metal negative electrode 20), a positive electrode compartment 25 that comprises a positive electrode 30 that is in contact with a liquid positive electrode solution 35, an alkali metal ion conductive electrolyte membrane 40 that separates the negative electrode from the positive electrode solution, a first terminal 45 and a second terminal 50. To provide a better understanding of the cell, a detailed description of each of the cell's components shown in FIG. 1 is provided below. Following this discussion is a brief description of how the cell functions.

As mentioned above, some embodiments of the cell 10 comprise a negative electrode compartment 15 and a positive electrode compartment 25. In this regard, the two compartments can be any suitable shape and have any other suitable characteristic that allows the cell to function as intended. By way of example, the negative electrode and the positive electrode compartments can be tubular, rectangular, or be any other suitable shape. Furthermore, the two compartments can have any suitable spatial relationship with respect to each other. For instance, while FIG. 1 shows an embodiment in which the negative electrode compartment 15 and the positive electrode compartment 25 are adjacent to each other, in other embodiments (not shown), one compartment (e.g., the negative electrode compartment) is disposed, at least partially, in the other compartment (e.g., the positive electrode compartment), while the contents of the two compartments remain separated by the electrolyte membrane 40 and any other compartmental walls.

With respect to the negative electrode 20, the cell 10 can comprise any suitable alkali metal negative electrode 20 that allows the cell to function (e.g., be discharged and recharged) as intended. Some examples of suitable negative electrode materials include, but are not limited to, sodium or lithium that is substantially pure and a sodium or lithium alloy comprising any other suitable sodium or lithium-containing negative electrode material. In certain embodiments, however, the negative electrode comprises or consists of either an amount of sodium or an amount of lithium that is substantially pure.

With respect to the positive electrode 30, the cell 10 can comprise any suitable positive electrode that allows the cell to be charged and discharged as intended. For instance, the positive electrode can comprise virtually any positive electrode material that has been successfully used in a sodium or lithium-based rechargeable battery system. In some embodiments, the positive electrode comprises one or more wires, strands of wires, pieces of felt, plates, tubes, meshes, pieces of foam, and/or one or more other suitable positive electrode configurations. Additionally, while the positive electrode can comprise any suitable material, in some embodiments it comprises a nickel foam, nickel hydroxide ($Ni(OH)_2$), nickel oxyhydroxide (NiOOH), sulfur composites, sulfur halides (including sulfuric chloride), carbon, copper, copper iodide, platinum, and/or another suitable material. Furthermore, these materials may coexist or exist in combinations. Indeed, in some embodiments, the positive electrode comprises copper, platinum, or copper iodide.

The liquid positive electrode solution 35 can comprise any suitable chemical that allows a metal plating to form on the positive electrode 30 as the cell 10 discharges and that allows the metal plating to go into solution as the cell charges. In some embodiments, the liquid positive electrode solution comprises an alkali metal compound, a metal complex, and/or a solvent.

Where the positive electrode solution 35 comprises an alkali metal compound, that compound can perform any suitable function, including, without limitation, helping the metal complex (discussed below) become soluble and protecting the alkali metal ion conductive electrolyte membrane 40 from degradation by dissolution. While the alkali metal complex can comprise any suitable component, in some embodiments, it comprises an alkali ion and one or more halide ions and/or pseudo-halide ions. While the alkali ion can comprise any suitable alkali ion, in some embodiments in which the negative electrode 20 comprises sodium or lithium, the alkali ion in the alkali metal compound respectively comprises a sodium ion and lithium ion. Moreover, some examples of suitable halide ions include, but are not limited to, iodide ions ($I^-$), chloride ions ($Cl^-$), fluoride ions ($F^-$), and bromide ions ($Br^-$). Furthermore, some examples of suitable pseudo-halide ions are selected from azide, thiocyanate, and cyanide. That said, other known pseudo-halide ions may also be used herein. Thus, some examples of suitable alkali metal compounds include NaI, NaCl, NaSCN, NaBr, NaN$_3$, NaSCN, LiI, LiBr, LiN$_3$, LiCl, and LiSCN. Indeed, in some implementations in which the negative electrode comprises sodium, the alkali metal compound comprises NaI or NaBr or NaOH. Similarly, in some implementations in which the negative electrode comprises lithium, the alkali metal compound comprises LiI or LiBr or LiOH.

When the cell is fully charged, the alkali metal compound can be at any suitable concentration in the positive electrode solution 35 that allows the cell 10 to function as intended. Indeed, in some embodiments, the alkali metal compound is present at a concentration as high as a concentration selected from about 6, about 8, about 10, about 12, and about 14 molar ("M"). In contrast, in some embodiments, the alkali metal compound is present at a concentration as low as a concentration selected from about 1, about 2, about 4, and about 5M. In still other embodiments, the alkali metal compound is present in the positive electrode solution in any suitable combination or sub-range of the aforementioned concentrations.

With reference now to the metal complex, the metal complex can comprise any suitable component that allows a metal to plate on and be removed from the positive electrode 30 as the cell 10 discharges and charges. In some embodiments, however, the metal complex comprises a complex of a metal ion and one or more ions selected from halide ions and pseudo-halides (both of which are discussed above). In this regard, the metal ion can comprise one or more ions of silver, aluminum, gold, bismuth, beryllium, cobalt, cadmium, chromium, copper, iron, zinc, gallium, mercury, magnesium, manganese, nickel, lead, titanium, vanadium, zirconium, niobium, molybdenum, tungsten, gallium, indium, and tin. Accordingly, some suitable examples of metal complexes include, but are not limited to CuI, AgI, CuBr, AgBr, AgCl, AlF$_3$, BeF$_2$, SnF$_4$, CuCl, PbCl$_2$, HgCl$_2$, HgBr$_2$, PbI$_2$, HgI$_2$, ZrI$_4$. Accordingly, in some embodiments, one or more of the following metals may plate on the positive electrode 30 during discharge: silver, aluminum, gold, bismuth, beryllium, cobalt, cadmium, chromium, copper, iron, zinc, gallium, mercury, magnesium, manganese, nickel, lead, titanium, vanadium, zirconium, niobium, molybdenum, tungsten, gallium, indium, and tin. Because in some embodiments, the metal complex comprises a metal iodide, such as AgI or CuI, in such embodiments, silver or copper, respectively, plate on the positive electrode during discharge.

Although some embodiments of the metal complex may initially be insoluble in the positive electrode solution 35, in some embodiments, the alkali metal compound ionizes and makes its halide or pseudo-halide ions able to complex with the metal compound to form a soluble complex ion. In this regard, some examples of suitable complex ions include, but are not limited to CuI$_2^-$, AgI$_2^-$, [AlF$_6$]$^-$, [AlF$_4$]$^-$, [BeF$_4$]$^{2-}$, [SnF$_6$]$^{2-}$, [CuCl$_2$]$^-$, [AgCl$_2$]$^-$, [PbCl$_4$]$^{2-}$, [ZnCl$_4$]$^{2-}$, [HgCl$_4$]$^{2-}$, [CuBr$_2$]$^-$, [AgBr$_2$]$^-$, [HgBr$_4$]$^{2-}$, [CuI$_2$]$^-$, [AgI$_2$]$^-$, [PbI$_4$]$^{2-}$, [FeCl$_4$]$^-$, [HgI$_4$]$^{2-}$, [Cd(SCN)$_4$]$^{2-}$, [Hg(SCN)$_4$]$^{2-}$, and combinations thereof. While this complex ion can be formed in any suitable manner, the following formula shows one non-limiting example in which copper iodide complexes with free iodide ions (e.g., from an ionized alkali metal compound) to form the complex ion:

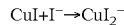

As the concentration of the metal complex (and corresponding complex ion) may be directly related to the capacity of the cell 10, the metal complex (and corresponding complex ion) can be present at any suitable concentration in the positive electrode solution 35 of a fully charged cell. In some embodiments, the metal complex (and corresponding complex ion) is present at a concentration as high as a concentration selected from about 2.5, about 3, about 4, about 5, and about 10M. In contrast, in some embodiments, the metal complex (and corresponding complex ion) is present at a concentration as low as a concentration selected from about 0.1, about 0.5, about 1, about 1.5, and about 2M. In still other embodiments, the metal complex (and corresponding complex ion) is present in the positive electrode solution in any suitable combination or sub-range of the aforementioned concentrations.

The positive electrode solution 35 can comprise any suitable solvent that allows the metal ion from the metal complex to electrochemically reduce to form metal plating on the positive electrode 30 during discharge and that allows the metal plating to electrochemically oxidize to form the metal ion (or complex ion) during recharge. In this regard, some examples of suitable solvents include an aqueous solvent such as water, a non-aqueous solvent (e.g., glycerol, ethylene glycol, formamide, dimethyl sulfoxide, propylene carbonate etc.), and combinations thereof. In some embodiments, however, the solvent comprises an aqueous solvent.

The solid alkali metal ion conductive electrolyte membrane 40 material may include, but is not limited to, an alkali Metal Super Ion Conductive (MeSICON) material, where "Me" represents an alkali metal, such as sodium or lithium. Non-limiting examples of MeSICON materials include ceramic NaSICON, β"-alumina, NaSICON-type materials, LiSICON, Lithium Lanthanum Zirconate, and LiSICON-type materials. In this regard, when the negative electrode 20 comprises sodium or a sodium alloy, the electrolyte membrane can comprise a material such as a NaSICON or a NaSICON-type material that selectively transports sodium ions. Similarly, when the negative electrode comprises lithium or a lithium alloy, the electrolyte membrane can comprise a material such as a LiSICON or a LiSICON-type material that selectively transports lithium ions. In any case, because MeSICON membranes are impervious to water, such membranes allow the cell 10 to function when the positive electrode compartment 25 comprises a solution (e.g., an aqueous solution) that is incompatible with the negative electrode 20.

With reference now to the terminals 45 and 50, the cell 10 can comprise any suitable terminals that are capable of electrically connecting the cell with an external circuit, including without limitation, to one or more cells. In this regard, the terminals can comprise any suitable material and any suitable shape of any suitable size.

In addition to the aforementioned components, the cell 10 can optionally comprise any other suitable component. By way of non-limiting illustration, FIG. 1 shows an embodiment in which the cell 10 comprises a heat management system 55. In such embodiments, the cell can comprise any suitable type of heat management system that is capable of maintaining the cell within a suitable operating temperature range. Some examples of such heat management systems include, but are not limited to, a heater, one or more temperature sensors, and appropriate temperature control circuitry.

Figure 2:
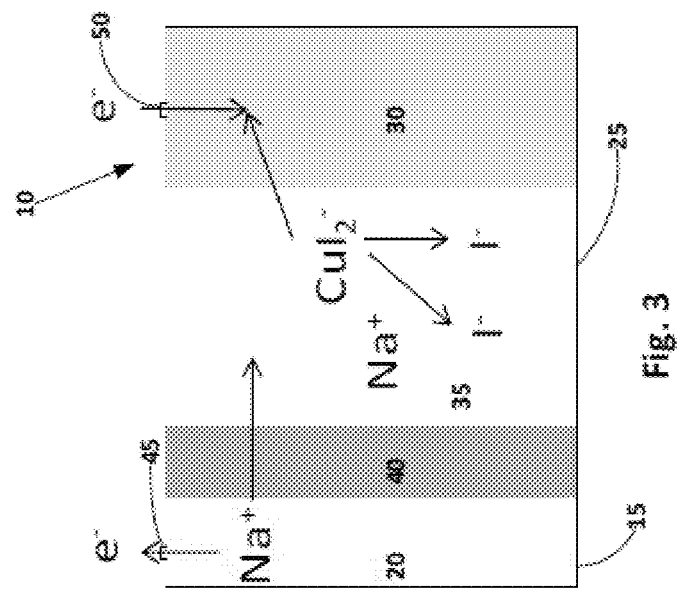
FIG. 2 depicts a schematic diagram of a representative embodiment of the secondary cell, wherein the cell is in the process of being charged.
Figure 3:
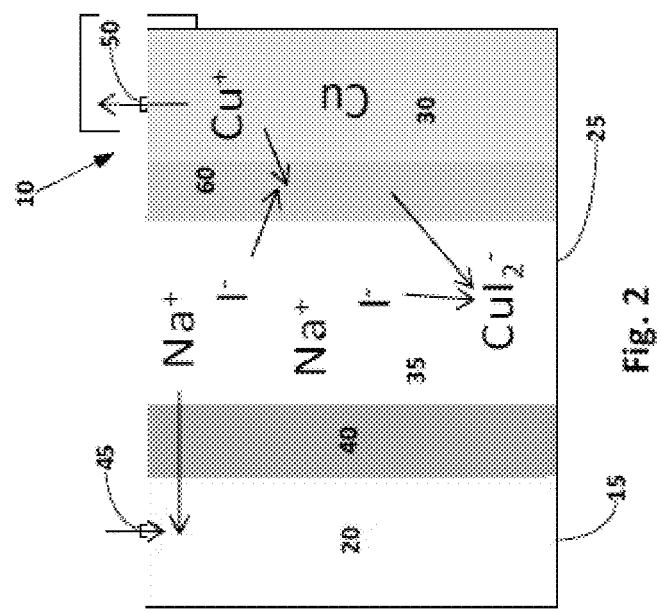
FIG. 3 depicts a schematic diagram of a representative embodiment of the secondary cell, wherein the cell is in the process of being discharged.

The described cell 10 can function in any suitable manner that allows it to be discharged and recharged. In one non-limiting example, FIGS. 2 and 3 respectively show a representative embodiment in which the cell 10 is charged and discharged. In particular, FIG. 3 shows that as the cell 10 is discharged and electrons (e$^-$) flow from the negative electrode 20 (e.g., via the first terminal 45), the alkali metal negative electrode 20 (e.g., Na or another suitable alkali metal) electrochemically oxidizes to release alkali metal ions (e.g., via the formula Na→Na$^+$+e$^-$, where the negative electrode comprises sodium), which are selectively transported through the alkali metal ion conductive electrolyte membrane 40. FIG. 3 also shows that as the cell 10 discharges, the metal complex ion (e.g., CuI$^{2-}$, which was formed from the interaction of the metal complex (e.g., CuI) with halide ions (e.g., I$^-$) from the alkali halide compound) reduces to allow the metal ion (e.g., Cu$^+$) to form metal plating on the positive electrode 30 (e.g., a copper electrode, via the reaction CuI$^{2-}$+e−→Cu(s)+2I$^-$). As this occurs, the free halide/pseudo-halide ions (e.g., I−) are balanced by the alkali ions (e.g., Na$^+$) in the positive electrode solution 35. In this regard, it is believed that the alkali ions are not complexed by the free halide/pseudo-halide ions, but are instead electrostatically attracted to each other by their opposing charges. Thus, where the cell comprises a sodium negative electrode, the complex ion of the metal complex comprises CuI$_2^-$, and the alkali metal complex comprises NaI, the overall reaction in the cell during discharge may be characterized as Na+CuI$_2^-$↔Na$^+$+Cu(s)+2I$^-$. The general discharge reaction can be written as: A+MX$_n^-$↔A$^+$+M(s)+nX$^-$, where A is the alkali metal, M is the metal that forms the complex ion species and is the complexing halide/pseudohalide species In contrast with FIG. 3, FIG. 2 shows that, in some embodiments, as the cell 10 is recharged and electrons (e$^-$) flow into the negative electrode 20 from an external power source (not shown), such as a recharger, the chemical reactions that occurred when the cell was discharged (as shown in FIG. 3) are reversed. Specifically, FIG. 2 shows that alkali ions (e.g., Na$^+$) in the positive electrode solution 35 are driven back through the electrolyte membrane 40, to the negative electrode compartment 15, where such ions are electrochemically reduced to form the alkali metal (e.g., via the reaction Na$^+$+e$^-$→Na). Additionally, FIG. 2 shows that as the cell 10 charges, the metal plating 60 electrochemically oxidizes to form the complex ion layer 60 (e.g., via the reaction Cu+2I$^-$→CuI$_2^-$+e$^-$) on the surface of the metal 30. Once formed, the complex ion species may diffuse away from the surface of the metal 30 into the positive electrode solution 35. Thus, in some embodiments in which the cell comprises a sodium negative electrode 20, the complex ion of the metal complex comprises CuI$_2^-$, and the alkali metal complex comprises NaI, the overall reaction in the cell during charging may be characterized as Na$^+$+Cu+2I$^-$↔Na+CuI$_2^-$. The general charge reaction can be written as: A$^+$+M+nX$^-$↔A+MX$_n^-$, where A is the alkali metal, M is the metal that forms the complex ion species and is the complexing halide/pseudohalide species The described cell 10 may function at any suitable operating temperature. In other words, as the cell is discharged and/or recharged, the alkali negative electrode 20 may have any suitable temperature. Indeed, in some embodiments in which the negative electrode comprises molten sodium that is in contact with the ion conductive membrane 40, the cell functions at an operating temperature that is as high as a temperature selected from about 120° C., about 130° C., about 150° C., and about 160° C. Moreover, in such embodiments, as the cell functions, the temperature of the sodium negative electrode can be as low as a temperature selected from about 118° C., about 115° C., about 110° C., and about 100° C. Indeed, in some embodiments, as the cell functions, the temperature of the sodium negative electrode is between about 100° and about 150° C. In other embodiments, the sodium negative electrode has a temperature between about 100° and about 130° C. In yet other embodiments, however, as the cell functions, the temperature of the sodium negative electrode is about 120° C.±about 10° C.

Indeed, in some embodiments in which the negative electrode 20 comprises molten lithium that is in contact with the ion conductive membrane 40, the cell functions at an operating temperature that is as high as a temperature selected from about 220° C., about 240° C., about 260° C., and about 280° C. Moreover, in such embodiments, as the cell functions, the temperature of the lithium negative electrode can be as low as a temperature selected from about 181° C., about 190° C., about 200° C., and about 210° C. Indeed, in some embodiments, as the cell functions, the temperature of the lithium negative electrode is between about 181° and about 260° C. In other embodiments, the lithium negative electrode has a temperature between about 190° and about 220° C. In yet other embodiments, however, as the cell functions, the temperature of the lithium negative electrode is about 65° C.±about 10° C.

The cell 10 can be modified in any suitable manner that allows it to be charged and discharged. In one non-limiting example, the cell is modified so that the negative electrode 20 is not molten as the cell operates. In this example, the negative electrode compartment 15 can comprise any suitable liquid negative electrode solution that: is compatible with the negative anode, allows alkali ions (e.g., Na+ or Li+) to be conducted therethrough, and that otherwise allows the cell to be charged and discharged. In this regard, some non-limiting examples of such solutions include salts such as NaPF$_6$, NaBF$_4$, NaFSI, NaCF$_3$SO$_3$ dissolved in solvents such as Ethylene Carbonate, Propylene Carbonate, Glymes, Ionic liquids and the like. In another non-limiting example, instead of comprising a metal ion and a plurality of ions selected from halide ions and pseudo-halide ions, the metal complex in the liquid positive electrode solution 35 comprises the metal ion and ammonia (NH$_3$) or a chelating agent, such as ethylenediaminetetraacetic acid (EDTA), crown ethers, oxalates, etc.

The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

Example 1

Figure 4:
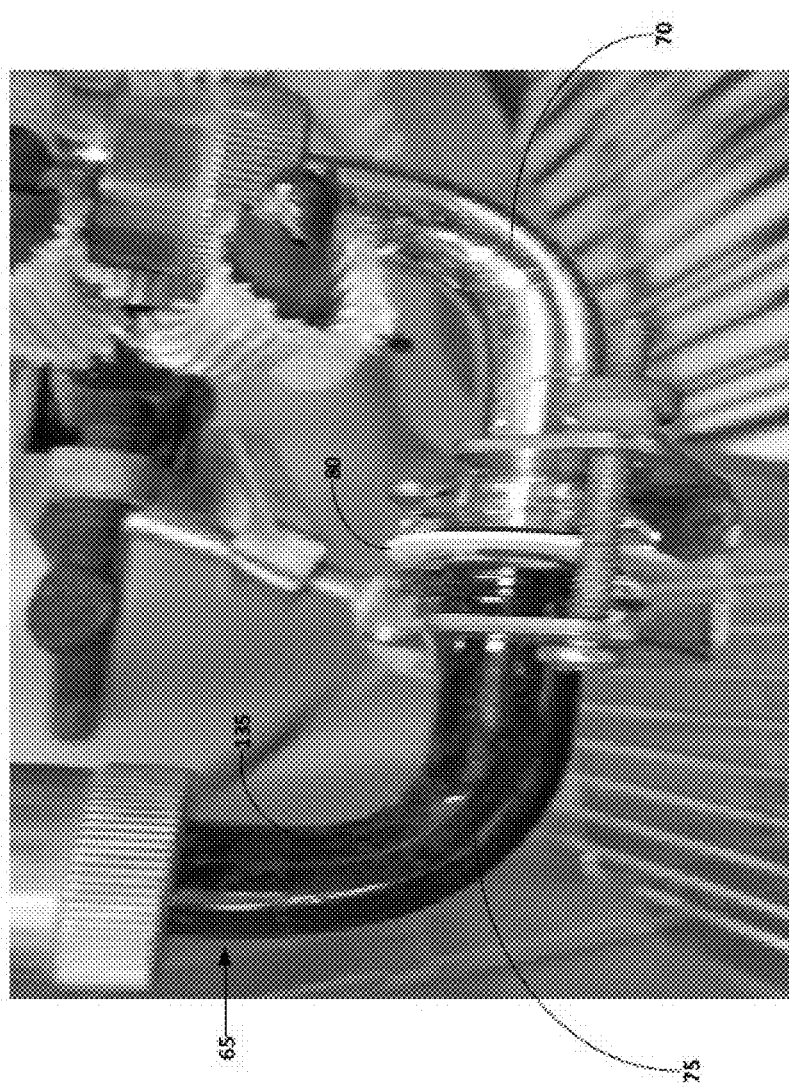
FIG. 4 shows a photo of a representative embodiment of the secondary cell.
Figure 5:
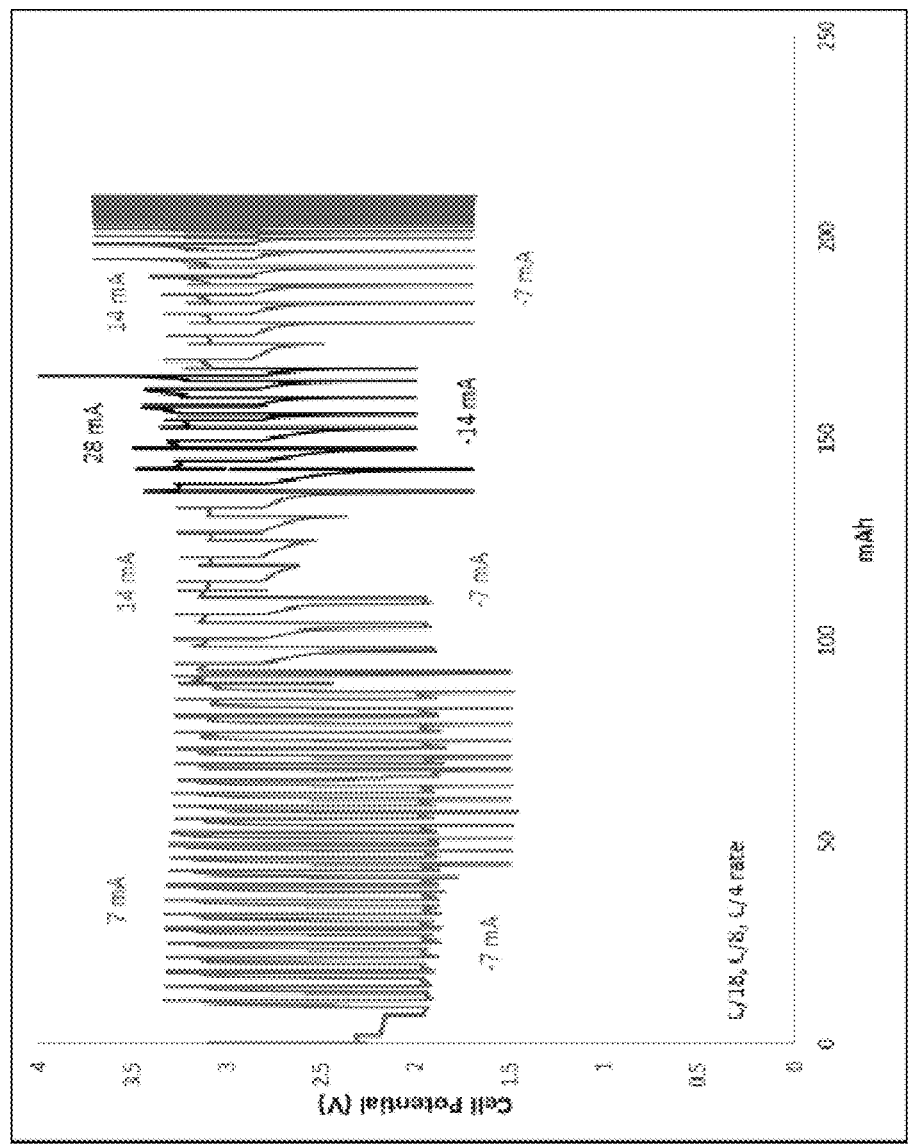
FIG. 5 depicts a graph showing cell potential in volts against cumulative milliamp hours ("mAh") for the cell of FIG. 4 during its cycling. Also shown is the actual charge/discharge currents.
Figure 6:
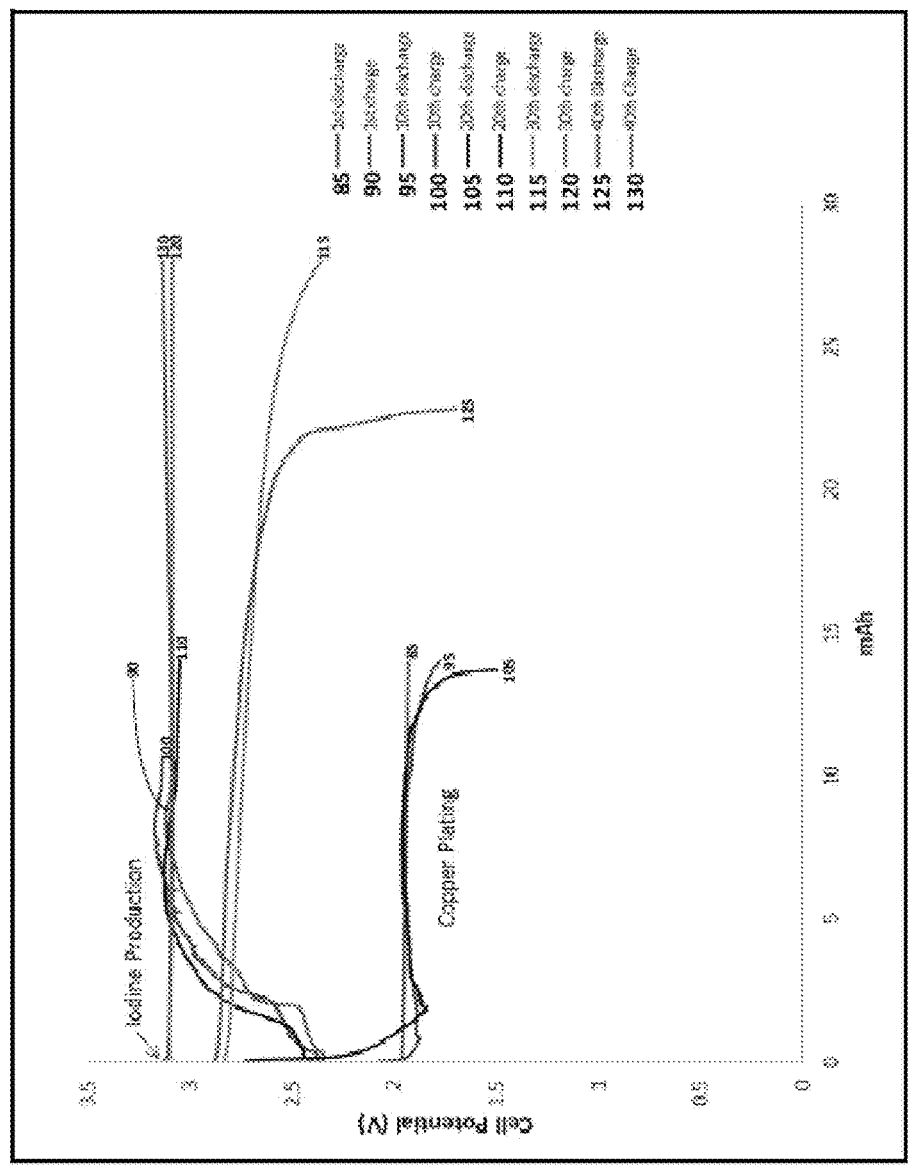
FIG. 6 depicts a graph showing cell potential in volts against mAh for the cell of FIG. 4 for several charge and discharge cycles.

In a first example, FIG. 4 shows an experimental setup in which a first Ucell 65 comprising a molten sodium negative electrode 70, a graphite rod and felt positive electrode 75, a NaSICON membrane 80 (e.g., a 1.4 cm$^2$ disk), 2M CuI functioning as the metal complex, and 10M NaI functioning as the alkali metal compound was operated at 110° C. As a result of the experimentation, the cell was found to have approximately a 120 mAh capacity. Additionally, FIG. 5 shows the cycling behavior of the Ucell 65 at different C-rates (C/18, C/8 and C/4) and the actual current through the cell during charge/discharge. Moreover, FIG. 6 is a graph showing the voltage behavior of Ucell 65 in volts against mAh for the cell during its 1$^{st}$ discharge 85, 1$^{st}$ charge 90, 10$^{th}$ discharge 95, 10$^{th}$ charge 100, 20$^{th}$ discharge 105, 20$^{th}$ charge 110, 30$^{th}$ discharge 115, 30$^{th}$ charge 120, 40$^{th}$ discharge 125, and 40$^{th}$ charge 130. The charging voltage is over 2.5V and closer to 3V during majority of the time indicating iodine generation as the predominant reaction. In this regard, FIG. 6 shows flat charge/discharge profiles during charge (iodine generation and subsequent copper iodide complex generation) and discharging (copper plating). The data also shows good charge/discharge cycle efficiency At the end of the tests, the first Ucell had been operated for over 210 hours, was cycled through 43 charge/discharge cycles, was charged/discharged to 10-20% State of Charge (SOC) and nearly 10-20% Depth of Discharge (DOD). Both the terms SOC and DOD are well known to the practitioners of the battery R&D and the standard definitions apply here, and was found to have a discharge voltage near 2V. As an additional experimental observation, it was found that the graphite positive electrode had a relatively high electrical impedance, and created an opaque patina on in the positive electrode compartment 135, which prevented observation of the copper plating and copper iodide complex formation in the cell.

Figure 7:
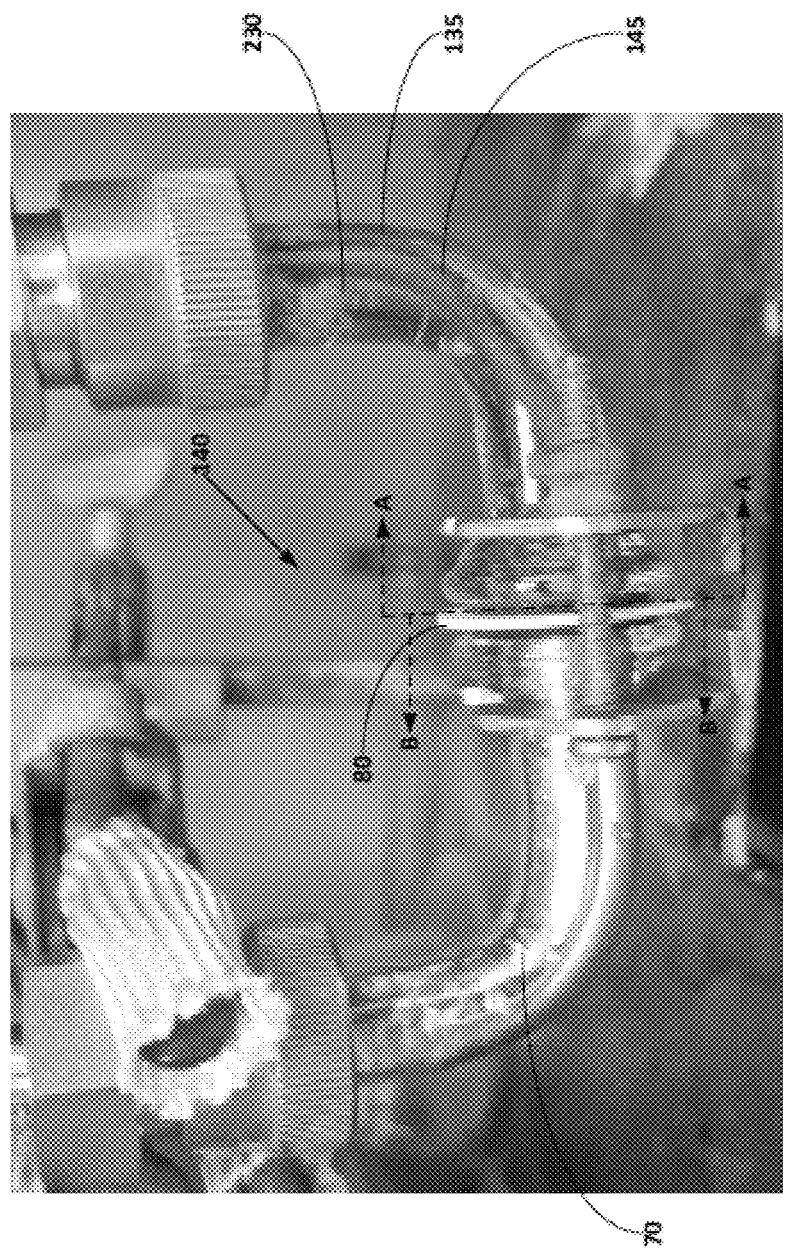
FIG. 7 depicts a photo of a representative embodiment of the secondary cell.
Figure 8:
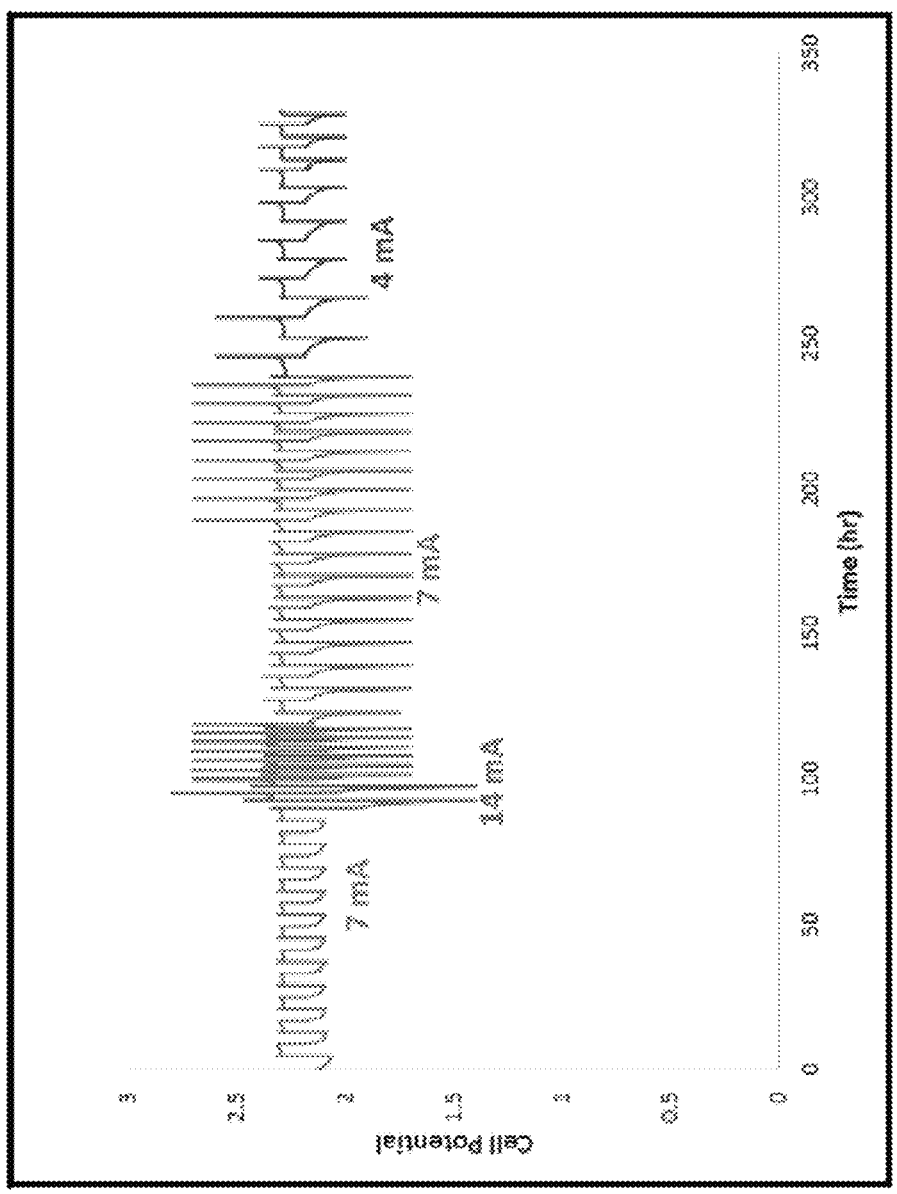
FIG. 8 depicts a graph showing cell potential in volts against time for the cell of FIG. 7 during its cycling.
Figure 9:
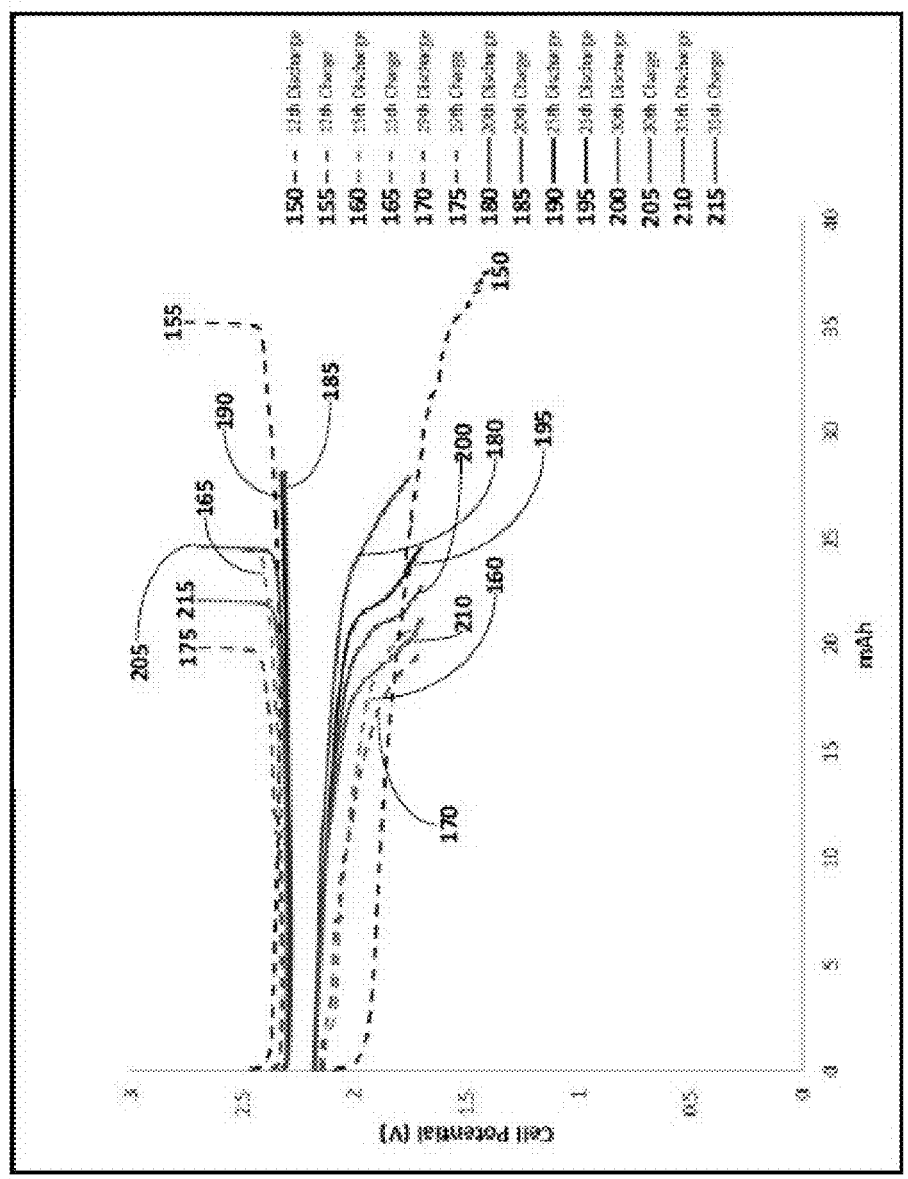
FIG. 9 depicts a graph showing cell potential against mAh for the cell of FIG. 7 for several charge and discharge cycles.
Figure 11:
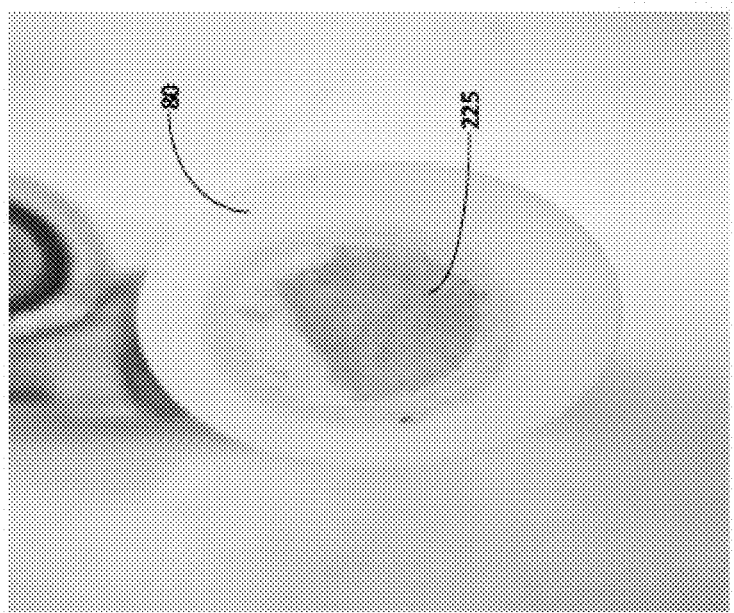
FIG. 11 depicts a cutaway view of the cell of FIG. 7 along line B-B, in which an impedance layer has formed on an alkali metal ion conductive electrolyte membrane of the cell of FIG. 7.
Figure 10:
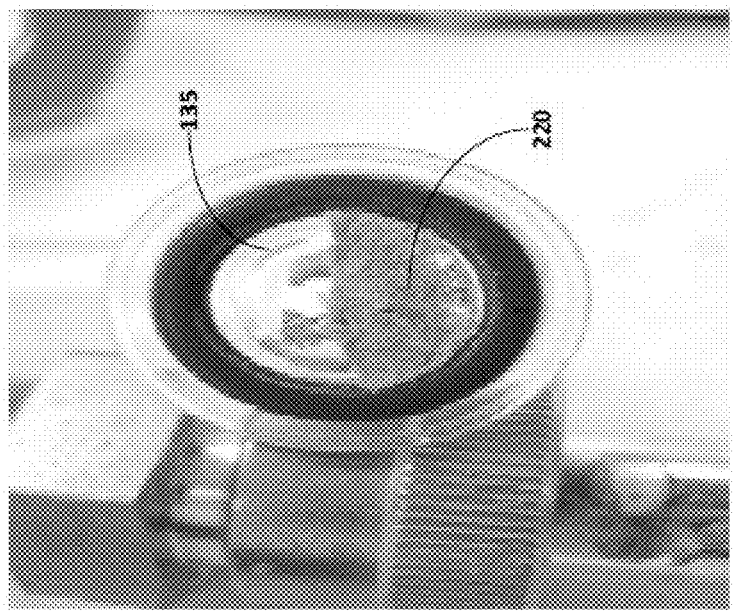
FIG. 10 depicts a cutaway view of the cell of FIG. 7 along line A-A, in which copper has settled at the bottom of a positive electrode compartment of the cell.

In a second example, FIG. 7 shows an experimental setup in which a second Ucell 140 was operated at 120° C., wherein the second Ucell comprised a molten sodium negative electrode 70, a copper wire positive electrode 145, a NaSICON membrane 80, 2M CuI functioning as the metal complex, and 10M NaI functioning as the alkali metal compound. As a result of the experimentation on this cell, the cell was found to have approximately a 160 mAh capacity. Additionally, FIG. 8 shows the cycling behavior of the Ucell 140 at different C-rates (C/18, C/8 and C/4) and the actual current through the cell during charge/discharge. The charge/discharge curves in this test exhibited lower overpotential behavior compared to the first example. The low overpotential has resulted in a different charge reaction (direct copper oxidation to $Cu^+$ ions followed by copper iodide complex generation) and discharging (copper plating). Moreover, FIG. 9 illustrates a graph showing the cell's potential in volts against mAh for the cell during its $12^{th}$ charge 150, $12^{th}$ discharge 155, $15^{th}$ discharge 160, $15^{th}$ charge 165, $19^{th}$ discharge 170, $19^{th}$ charge 175, $20^{th}$ discharge 180, $20^{th}$ charge 185, $25^{th}$ discharge 190, $25^{th}$ charge 195, $30^{th}$ discharge 200, $30^{th}$ charge 205, $35^{th}$ discharge 210, and $35^{th}$ charge 215. The charging voltage is below 2.5V during majority of the time indicating copper oxidation instead of iodine generation as the predominant reaction. In this regard, FIG. 9 shows flat charge/discharge profiles during charge (copper iodide complex generation) and discharging (copper plating). The data also shows good charge/discharge cycle efficiency . . . . At the end of the tests, it was found (as shown in FIG. 10) that some of the copper plating 220 had settled in the bottom of the positive electrode compartment 135 so that the copper plating was not bound to the positive electrode 145 and some of the cell's capacity was lost. Additionally it was found that a relatively small impedance layer 225 (as shown in FIG. 11) had formed on the electrolyte membrane 80. Moreover, after the cell had been operated for over 330 hours, was cycled through 43 charge/discharge cycles, was charged/discharged at about 25% SOC and a DOD of nearly 25%, and was found to have a discharge voltage near 2.15V, it was also found that while the positive electrode solution (shown in FIG. 7) remained substantially clear, the copper wire electrode was somewhat disintegrated at the interface between the wire and its insulating jacket (not shown).

Figure 12:
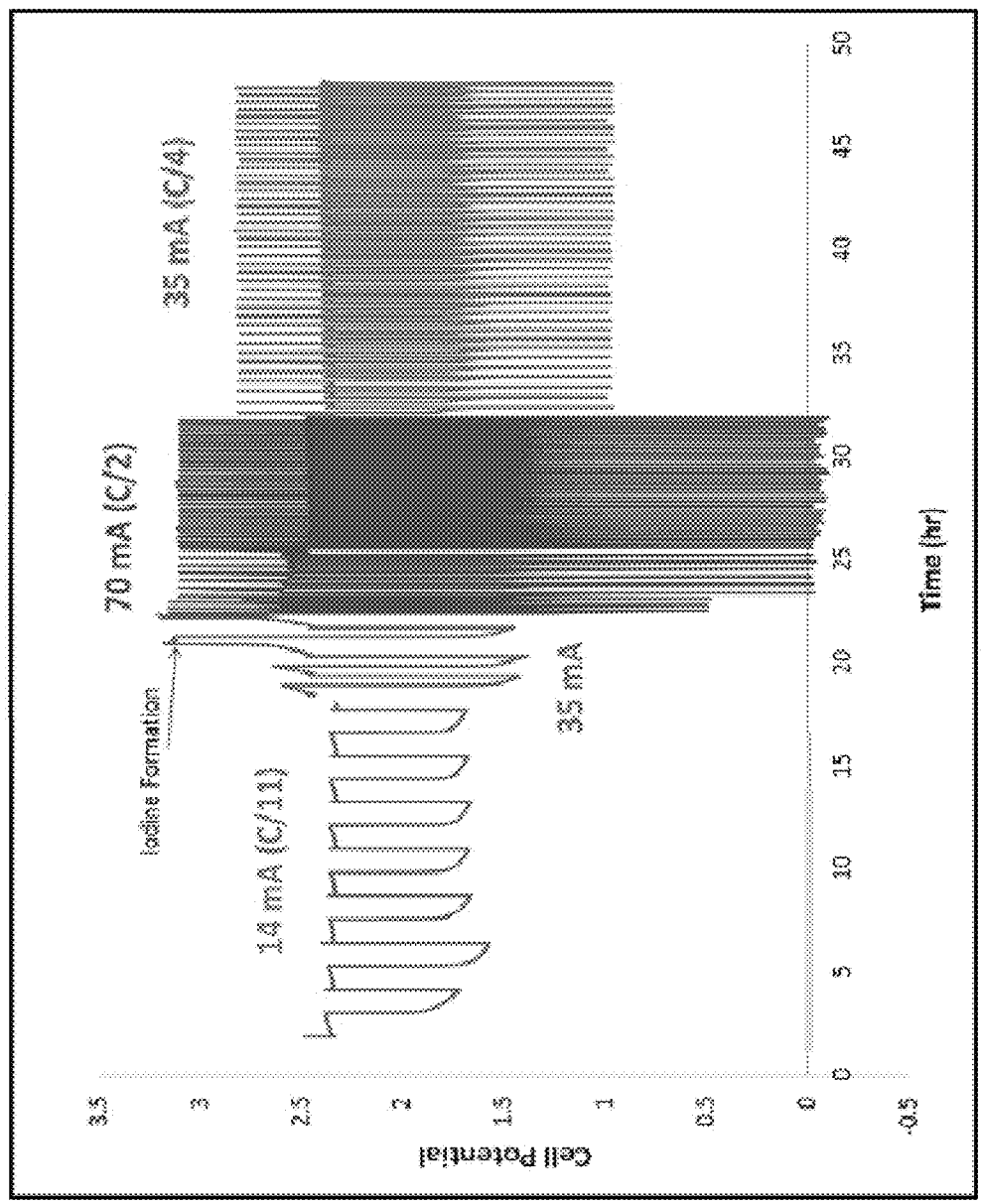
FIG. 12 depicts a graph showing cell potential against time for a representative embodiment of the secondary cell during its cycling.
Figure 13:
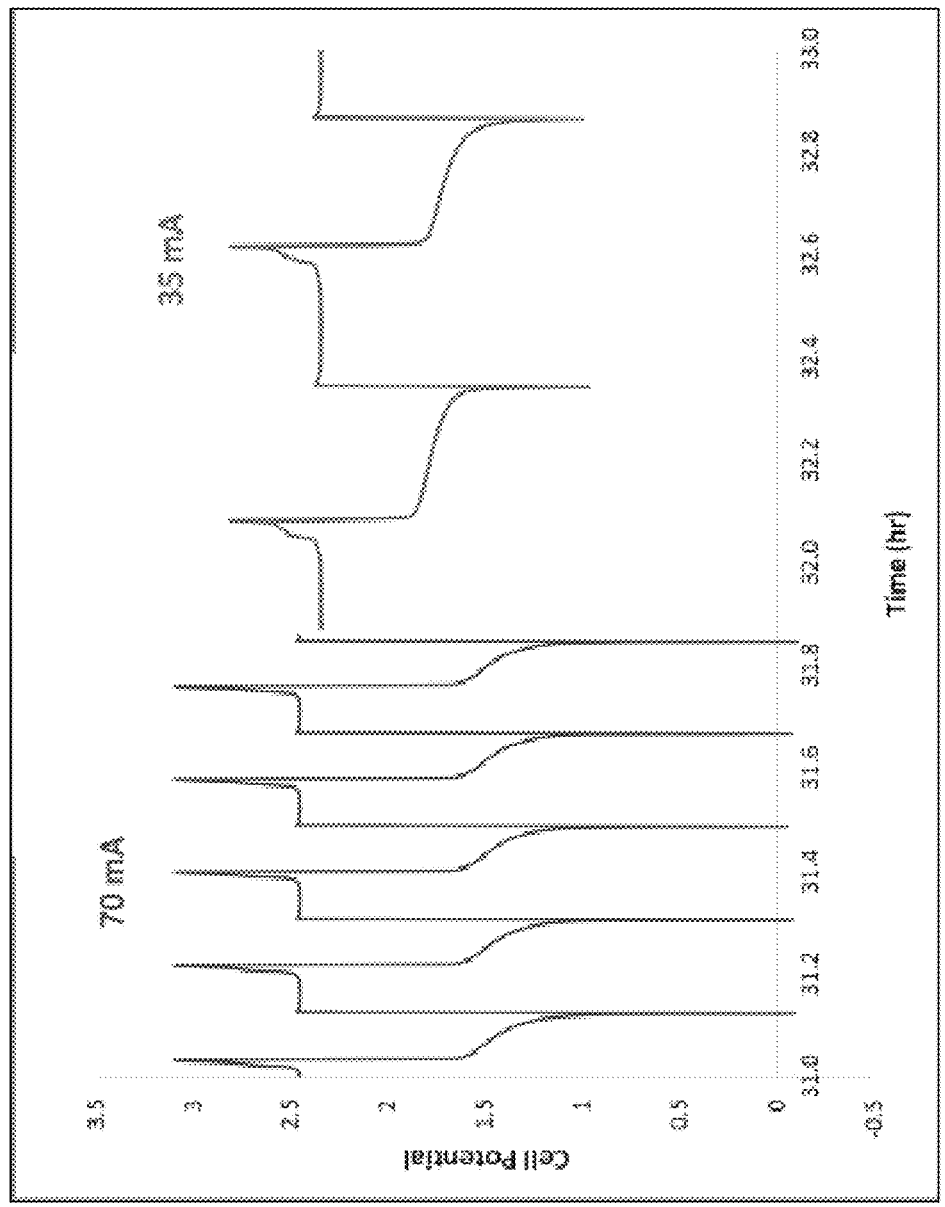
FIG. 13 depicts a graph showing cell potential against time for a representative embodiment of the secondary cell during its cycling over a specific time period.
Figure 14:
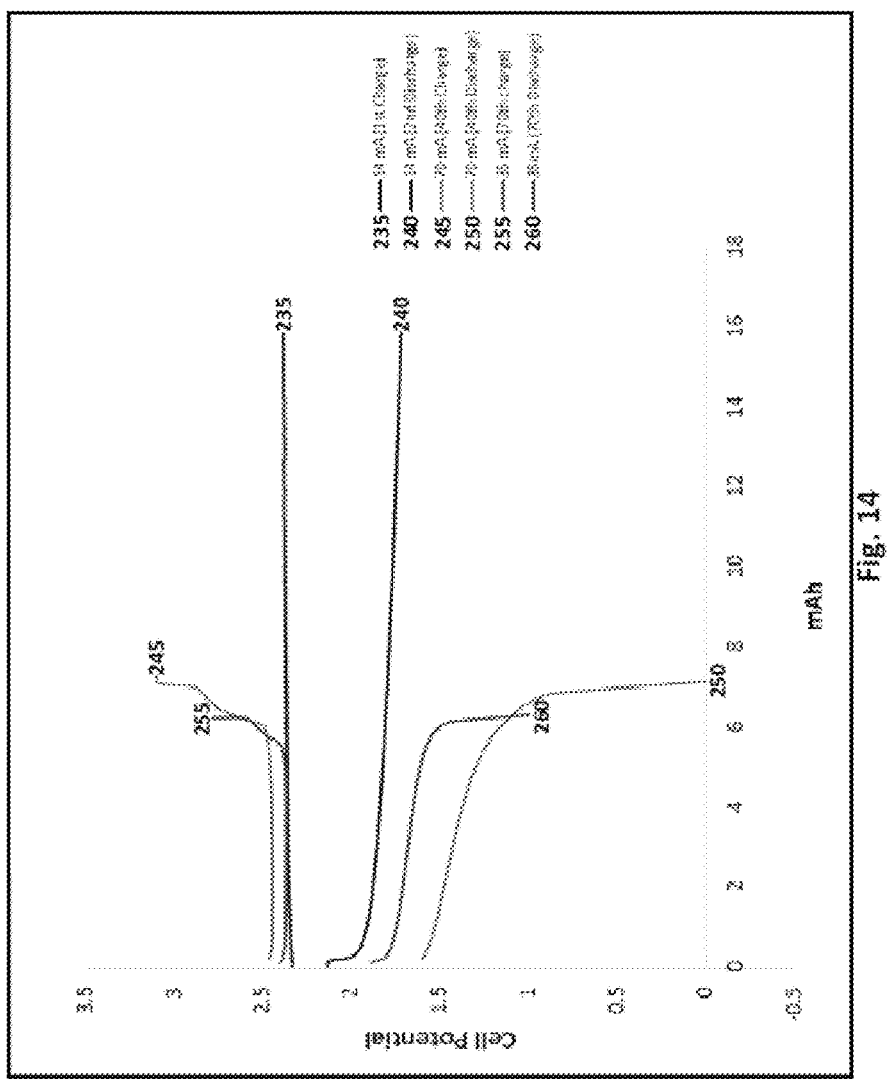
FIG. 14 depicts a graph showing cell potential in volts against mAh for a representative embodiment of the cell for specific cycles with differing C-rates.
Figure 15:
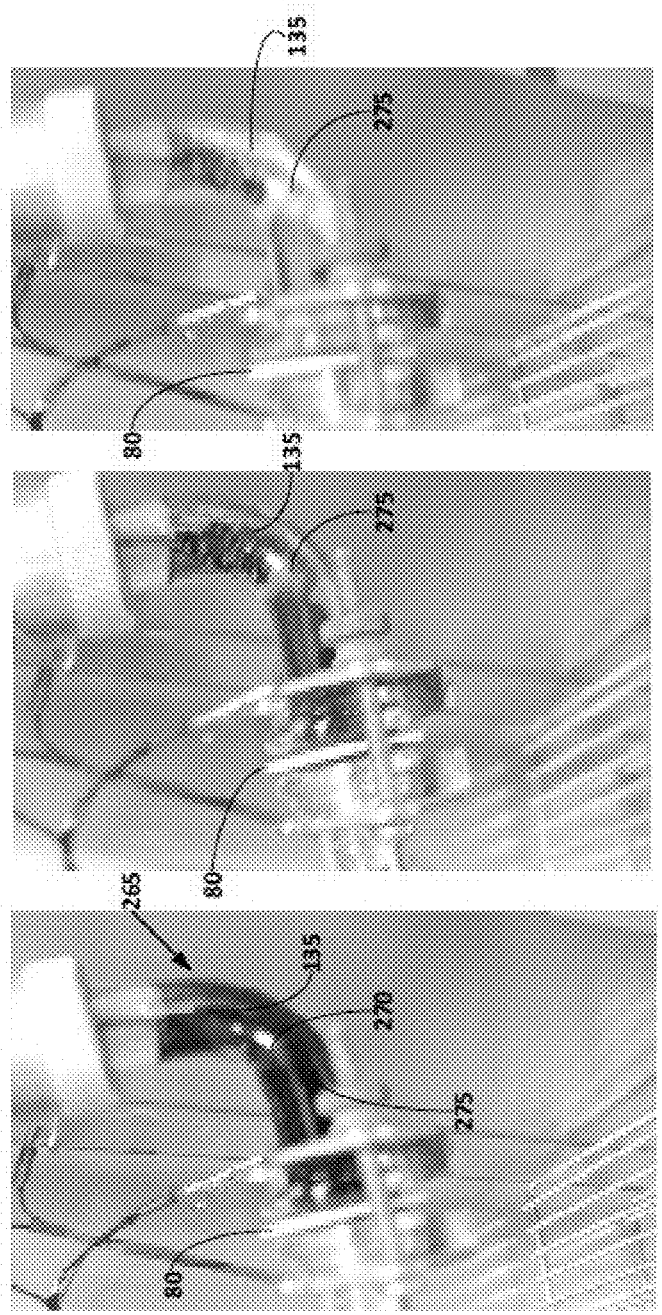
FIG. 15A depicts a perspective view of a representative embodiment of the cell in which iodine is produced in the positive electrode compartment.
FIG. 15B depicts a perspective view of a representative embodiment of the cell in which iodine is reacting with copper to form copper iodide.
FIG. 15C depicts a perspective view of a representative embodiment of the cell in which iodine is substantially consumed.

In a third example, a third Ucell 265 (shown partially in FIG. 15A) was prepared with a setup similar to that of the second Ucell 140, except that: the positive electrode comprised a multi-stranded copper wire, the cell was charged/discharged at 10% SOC, and the cell was operated at 125° C. The theoretical capacity of the cell is calculated to be 140 mAh. FIG. 12 shows the cycling behavior of the Ucell 265 at different C-rates (C/11, C/2 and C/4) and the actual current through the cell during charge/discharge. The charge/discharge curves in this test exhibited higher overpotential behavior compared to the first and second examples. The charge/discharge profiles shows initial charge voltages for C/11 cycling are below 2.5 V indicating copper oxidation and higher C-rate cycling has resulted in both copper oxidation and iodine generation reactions. FIG. 13 shows a charge/discharge profiles for a fraction of C/2 and C/4 cycling regimes in which the initial charge voltages for C/11 cycling are below 2.5 V indicating copper oxidation and higher C-rate cycling has resulted in both copper oxidation and iodine generation reactions during charge (iodine generation and subsequent copper iodide complex generation) and discharging (copper plating). The data also shows good charge/discharge cycle efficiency. Additionally, FIG. 14 shows a battery curve for different current densities in which line 235 represents 14 mA ($1^{st}$ charge), line 240 represents 14 mA ($2^{nd}$ discharge), line 245 represents 70 mA ($40^{th}$ charge), line 250 represents 70 mA ($40^{th}$ discharge), line 255 represents 35 mA ($70^{th}$ charge), and line 260 represents 35 mA ($70^{th}$ charge). Additionally, FIG. 15A shows that as the cell 265 operated iodine 270 was produced at 3.1 V. FIG. 15B shows that the iodine 270 reacted with copper to form copper iodide (e.g., via the following reactions $I_2+2Cu \rightarrow 2CuI$, $I_2+2I^-+2Cu \rightarrow 2CuI_2^-$). Moreover, FIG. 15C shows that the positive electrode solution 275 becomes clear as the iodine is consumed. Furthermore, after 92 cycles in 48 hours, it was found that this third cell 265 is operable at approximately 50 $mA/cm^2$, but with reduced capacity. It was also found that the copper wire electrode was partially disintegrated at the copper/insulation interface and that some copper particles had built up on and near the membrane 80.

Figure 16:
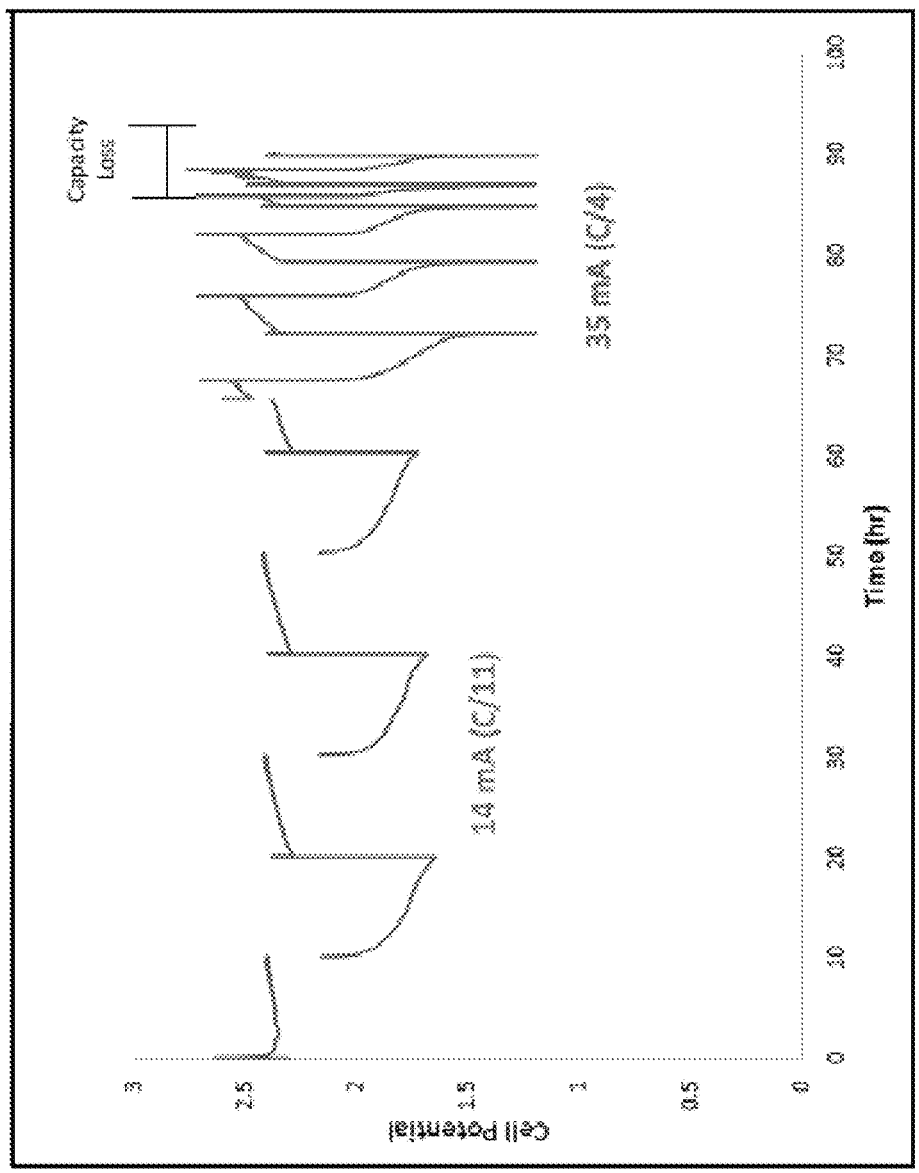
FIG. 16 depicts a graph showing cell potential against time for a representative embodiment of the cell during its cycling.
Figure 17:
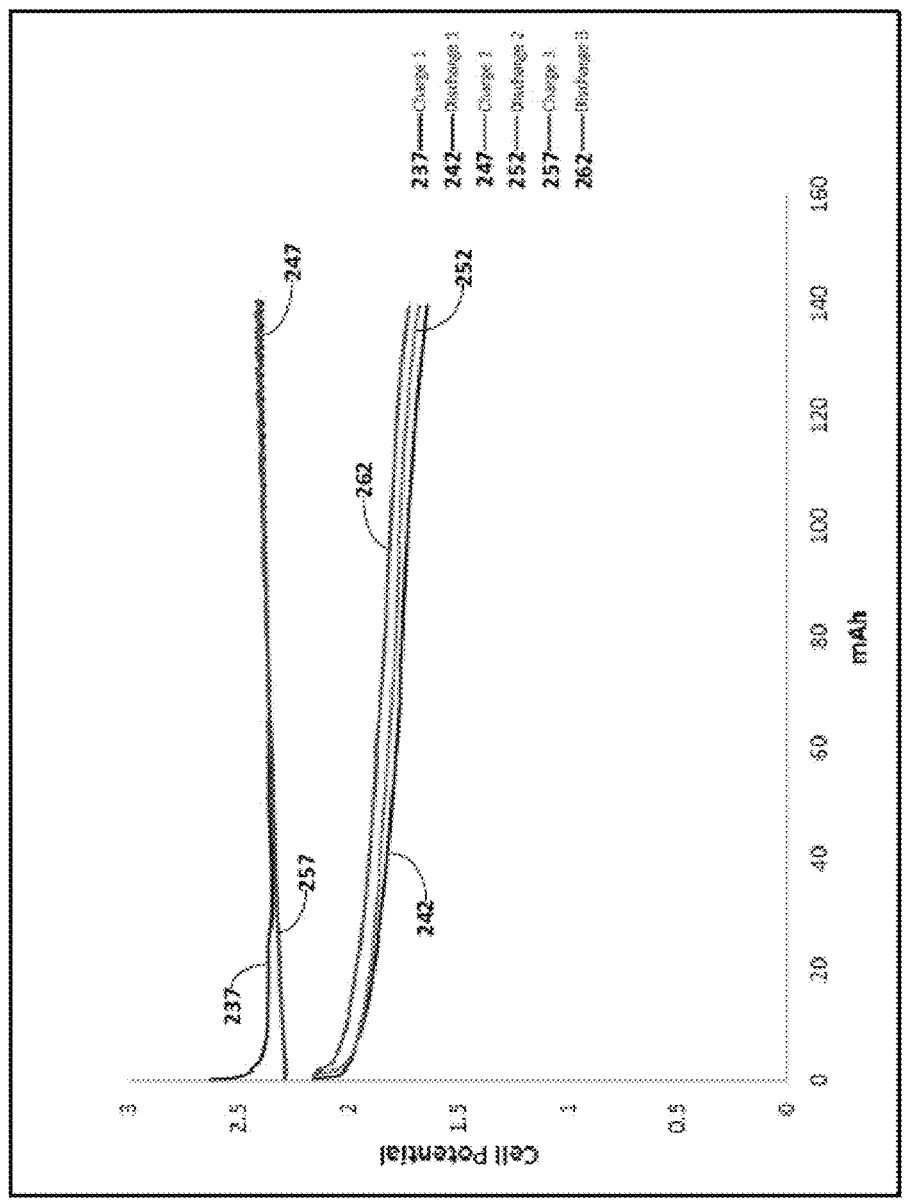
FIG. 17 depicts a graph showing cell potential in volts against mAh for a representative embodiment of the cell for the first 3-cycles.

In a fourth experiment, a fourth Ucell (not shown) was set up to determine the maximum concentration of CuI in the cell before it would be overcharged (as indicated by the production of iodine). In this regard, the cell was set up substantially like the first Ucell 65, except that: the cell in this example initially comprised 10M NaI but did not contain any CuI, and the positive electrode was a copper wire and copper wool, which was used to form $CuI_2^-$ in the cell. As the cell was operated, FIG. 16 shows charge and discharge voltages corresponding to copper oxidation and copper plating respectively. However, the high C-rate cycling (C/4) showed loss in capacity after three cycles. FIG. 17 further shows the charge/discharge curves for the C/11 cycling, where in line 237 represents a $1^{st}$ charge, line 242 represents a $1^{st}$ discharge, line 247 represents a $2^{nd}$ charge, line 252 represents a $2^{nd}$ discharge, line 257 represents a $3^{rd}$ charge, and line 262 represents a $3^{rd}$ discharge As a result of the experiments run on this cell, it was found that: the cell did not fully charge and therefore did not meet the objective of determining the maximum concentration of CuI before overcharge; there was undesirable capacity loss, even with excess copper; and there was a build-up of copper particles on the membrane 80, which may possibly have blocked sodium transport.

Figure 18:
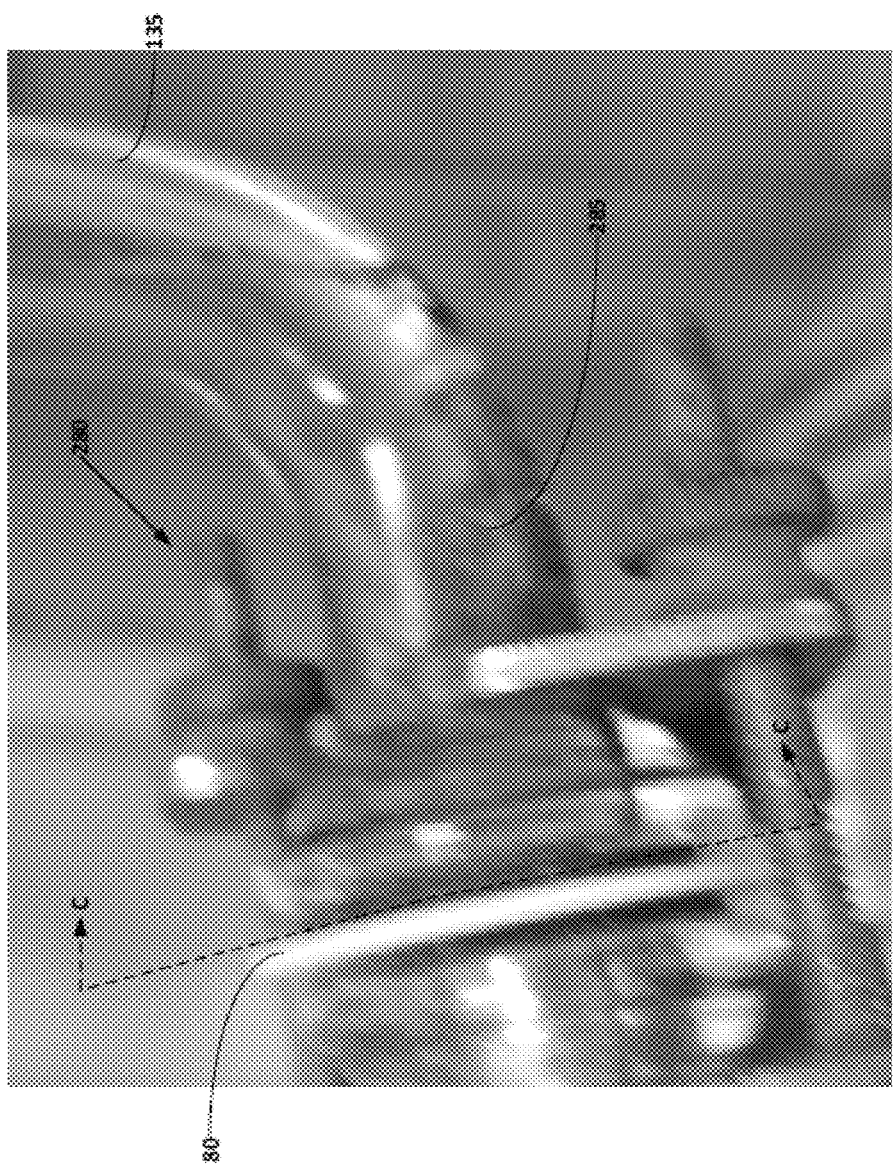
FIG. 18 shows a perspective view of a representative embodiment of a portion of the secondary cell.
Figure 19:
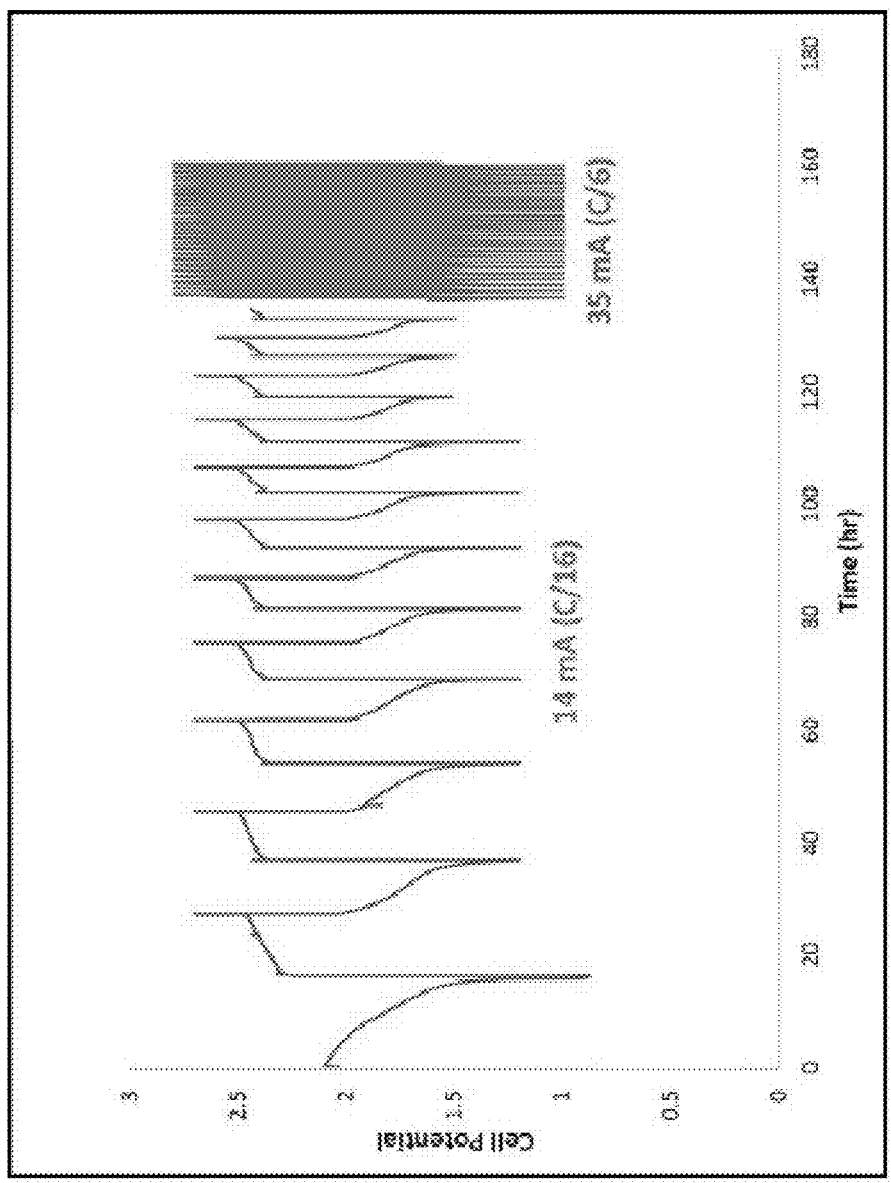
FIG. 19 depicts a graph showing cell potential against time for the cell of FIG. 18 during its cycling.
Figure 20:
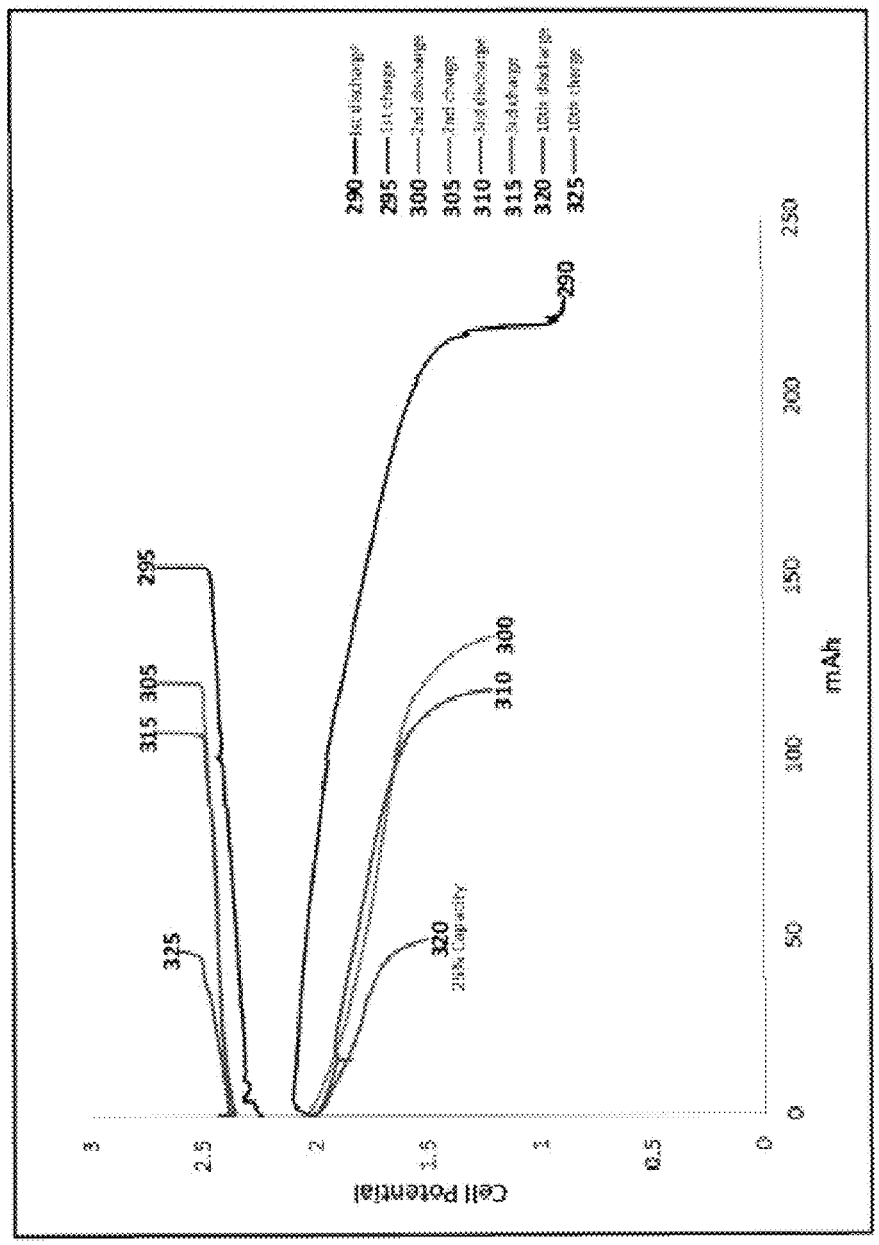
FIG. 20 depicts a graph showing cell potential against mAh for the cell of FIG. 18 for several charge/discharge cycles.
Figure 21:
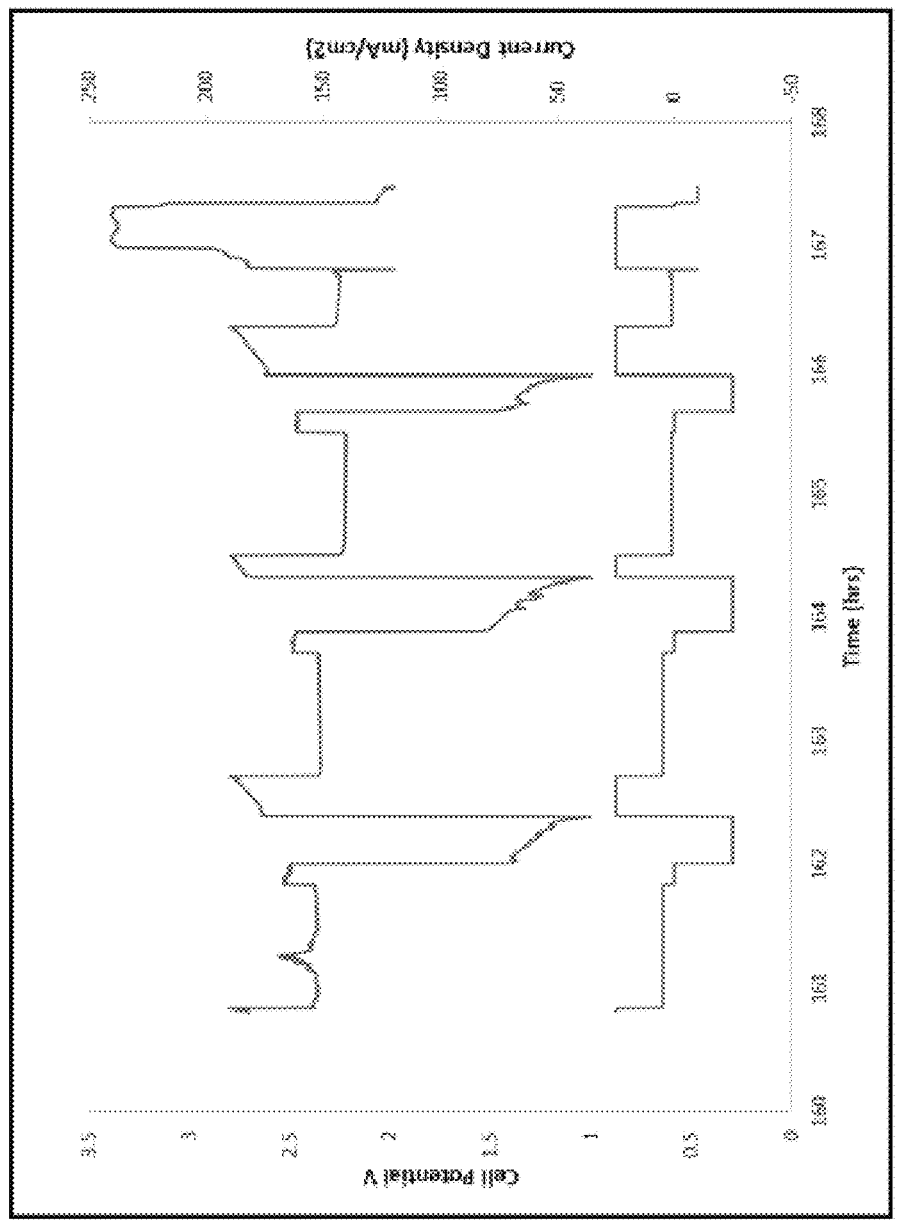
FIG. 21 depicts a graph showing the overcharge of the cell of FIG. 18 from hour 167 onwards.
Figure 22:
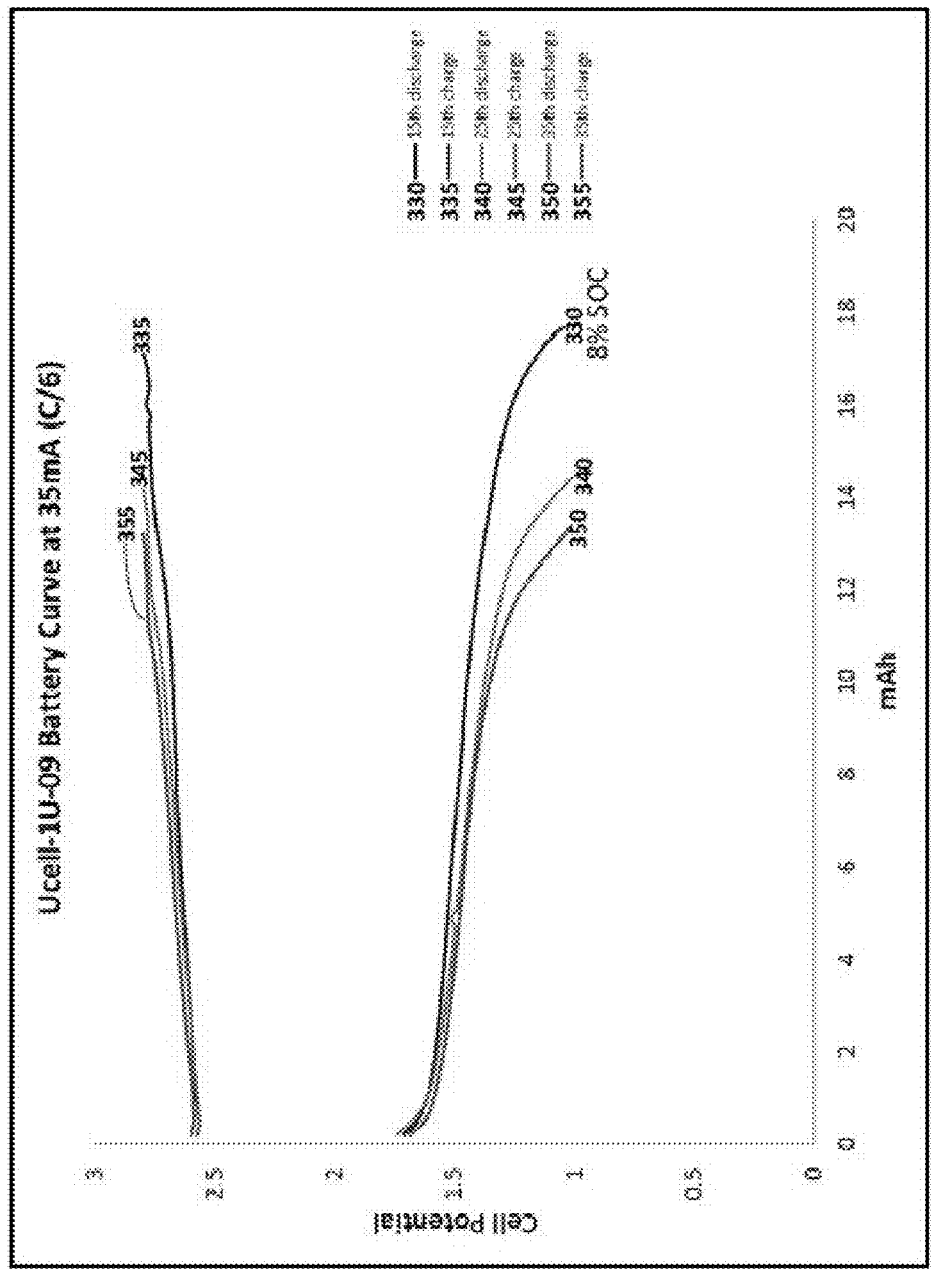
FIG. 22 depicts a graph showing cell potential in volts against mAh for the cell of FIG. 18.
Figure 23:
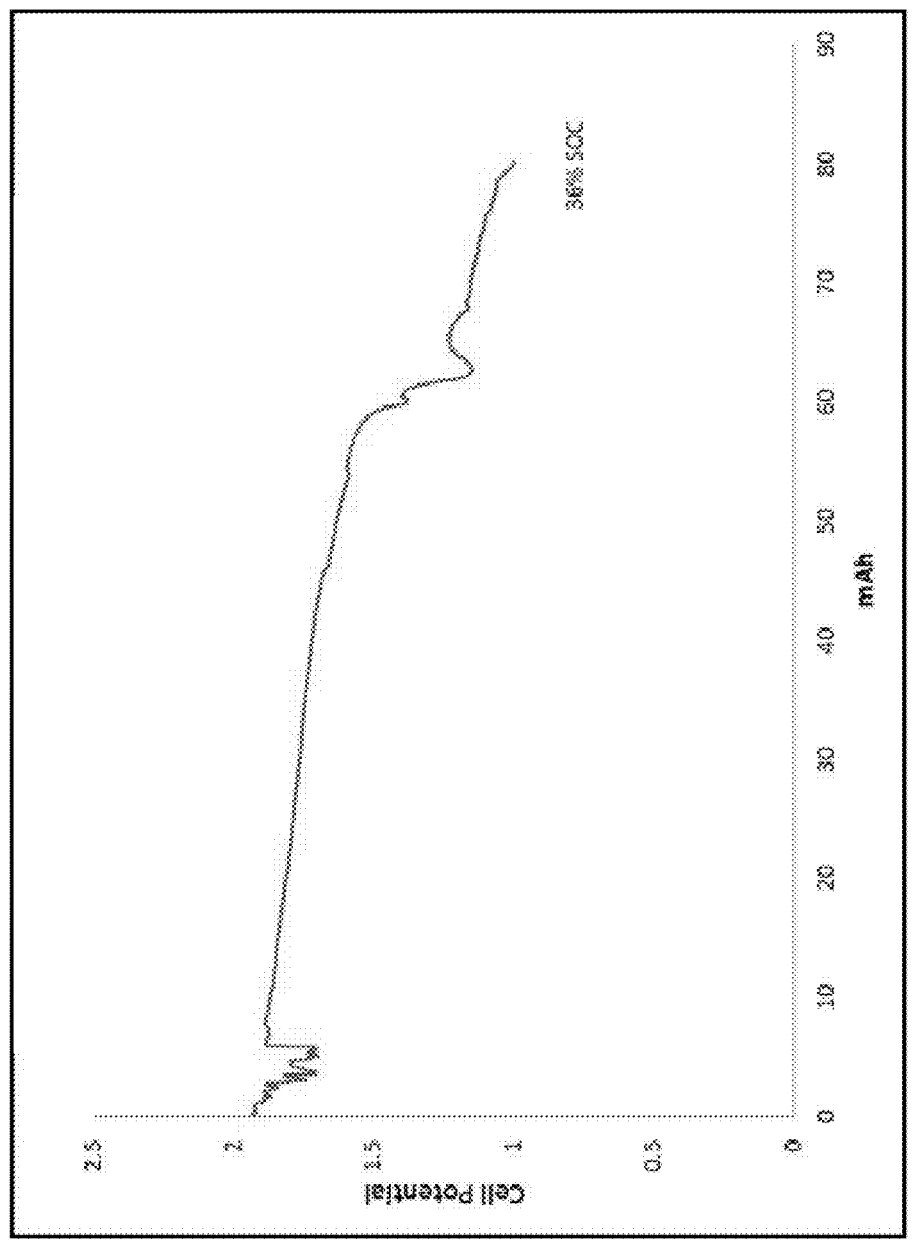
FIG. 23 depicts a graph showing cell potential in volts against mAh for the cell of FIG. 18.

In a fifth example, FIG. 18 shows a portion of a fifth Ucell 280 having an experimental setup similar to that shown above in example 1, except that the cell in this Figure comprises a platinum mesh positive electrode 285, 2.5M CuI in 9.5M NaI, and was operated at 130° C. This cell has a theoretical capacity of 220 mAh. In this regard, FIG. 19 shows the cycling behavior of the Ucell 280 at different C-rates (C/16 and C/6) and the actual current through the cell during charge/discharge. The charge/discharge curves in this test exhibited lower overpotential behavior similar to second example. The low overpotential has resulted in direct copper oxidation to Cu$^+$ ions during oxidation followed by copper iodide complex generation) and discharging (copper plating). FIG. 20 shows the charge/discharge behavior as a function of cycle number in which line 290 represents a 1$^{st}$ discharge, line 295 represents a 1$^{st}$ charge, line 300 represents a 2$^{nd}$ discharge, line 305 represents a 2$^{nd}$ charge, line 310 represents a 3$^{rd}$ discharge, line 315 represents a 3$^{rd}$ charge, line 320 represents a 10$^{th}$ discharge, and line 325 represents a 10$^{th}$ charge. The data shows gradually decreasing charge/discharge capacity mainly due to loss of contact of the plated copper to the current collector. In an experiment showing the removal of free floating copper through overcharge, FIG. 21 shows a series of charge/discharges followed by a period of overcharge between hours 166-167.5. Iodine generation can be observed after hour 167 at which iodine generation can be observed. The generated iodine has then reacted with some of the copper that has lost contact with current collector and converted it back to CuI. FIG. 22 shows the capacity of the cathode during cycling, in which line 330 represents the 15$^{th}$ discharge, line 335 represents the 15$^{th}$ charge, line 340 represents the 25$^{th}$ discharge, line 345 represents the 25$^{th}$ charge, line 350 represents the 35$^{th}$ discharge, and line 355 represents the 35$^{th}$ charge. The data in FIG. 22 is collected before the data in FIG. 21 and shows declining capacity due to loss of copper contact. Additionally, FIG. 23 shows that after the overcharging (FIG. 21), the discharge capacity can be improved as can be seen by comparing data from FIGS. 22 and 23. As a result of the experiments run on this cell, it was found that: after 42 cycles in 176 hours, the cell's actual capacity of 220 mAh matched the theoretical capacity determined based on the CuI concentration. Moreover, it was found that at least some capacity loss can be returned through overcharging the cell. That said, it was also found that gas pressure built up in the cell (likely from gas evolution due to overcharging) and caused the cell to fail.

Figure 24:
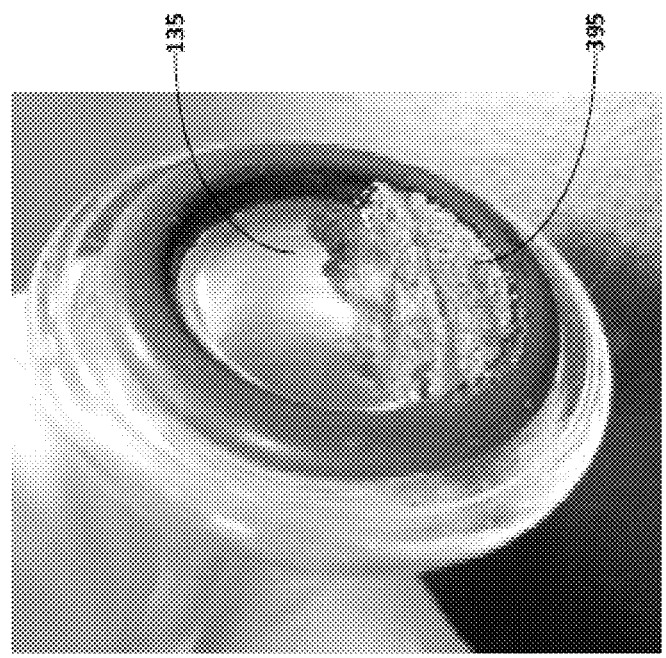
FIG. 24 shows a cutaway view of the cell of FIG. 18 along line C-C, in which copper has settled at a bottom portion of the positive electrode compartment of the cell.
Figure 25:
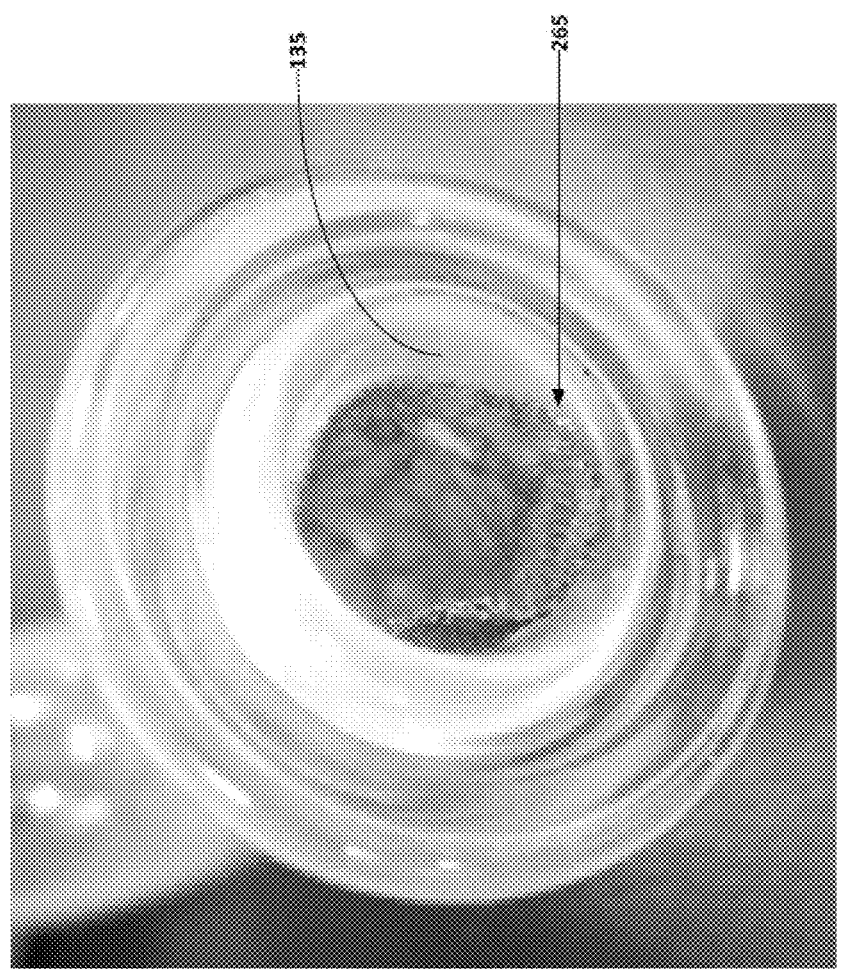
FIG. 25 depicts a perspective view of a representative embodiment of the positive electrode compartment of the cell comprising a mesh positive electrode disposed at the bottom portion of the compartment.
Figure 26:
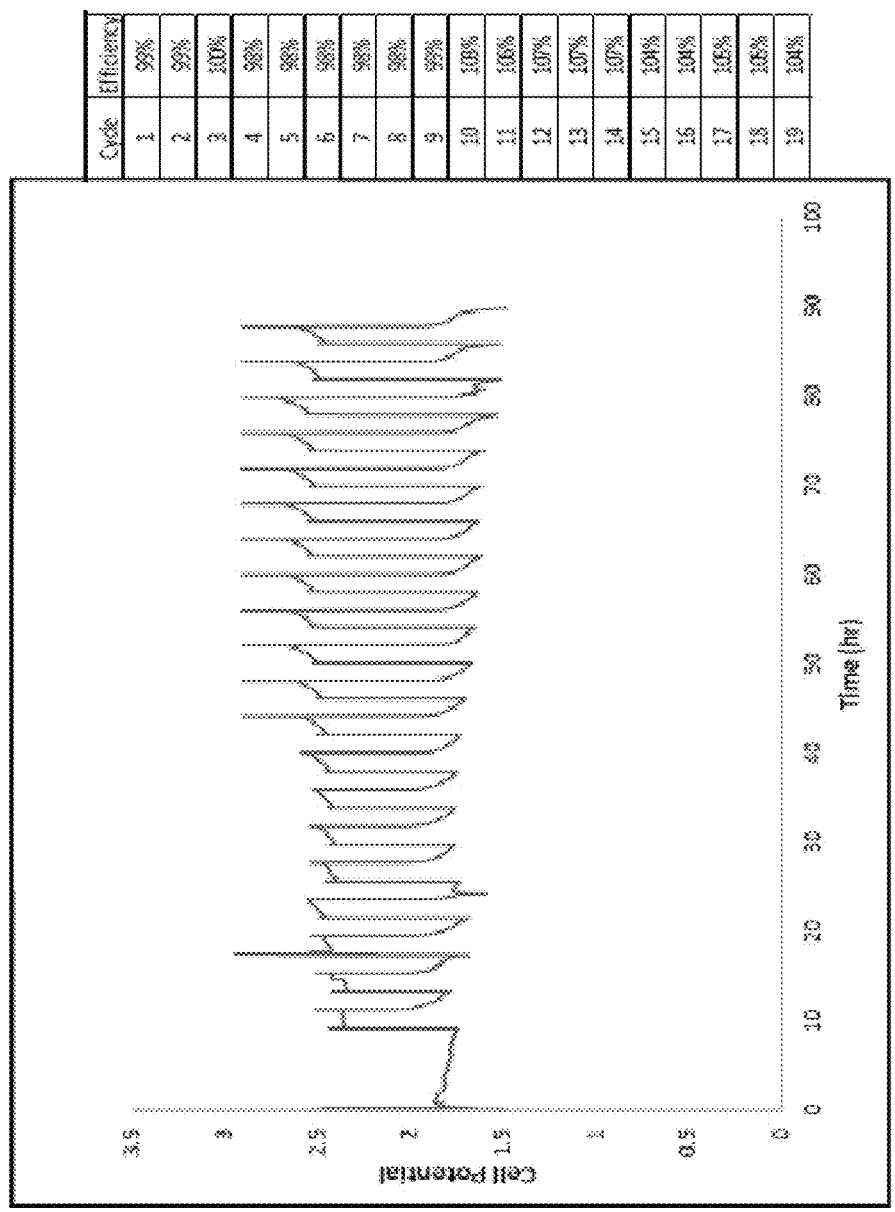
FIG. 26 depicts a graph showing cell potential against time for a representative embodiment of the cell.
Figure 27:
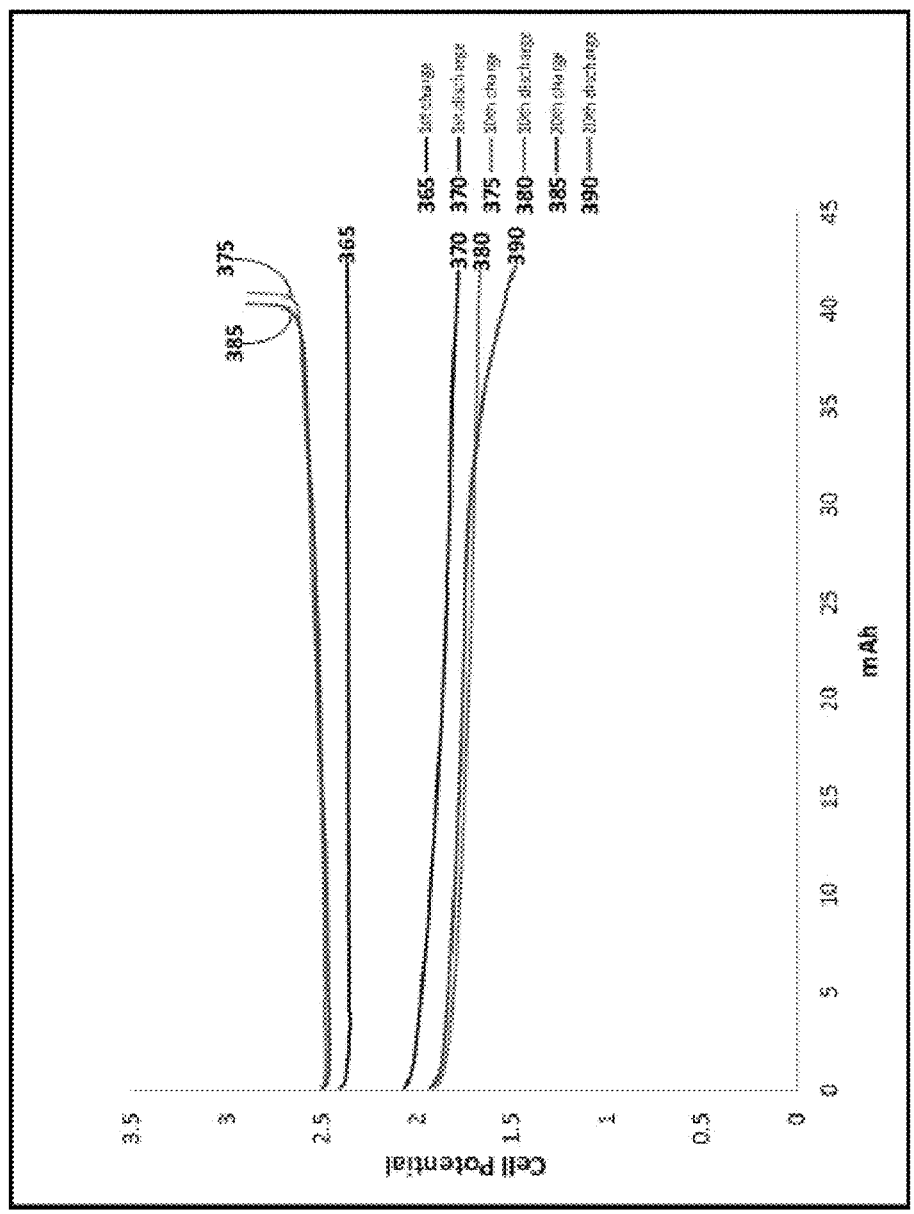
FIG. 27 depicts a graph showing cell potential against mAh for a representative embodiment of the cell.
Figure 28A:
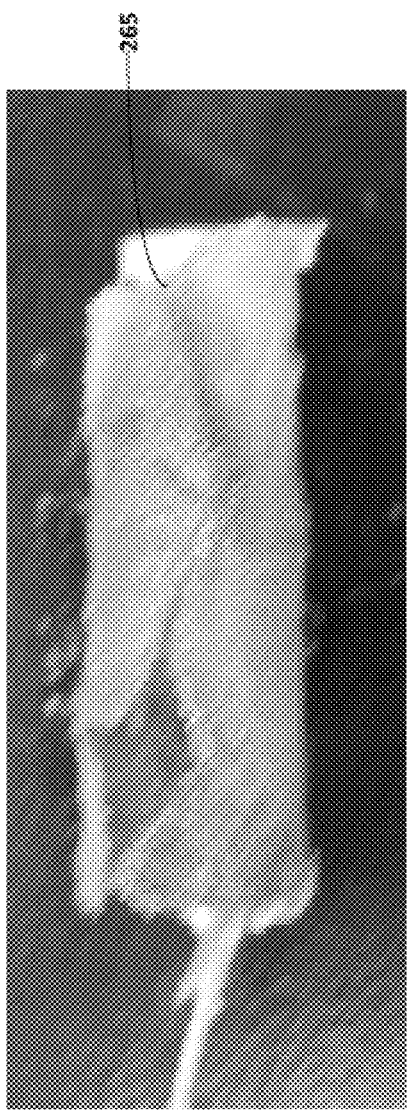
FIG. 28A shows a top perspective view of a representative embodiment of the mesh positive electrode of FIG. 25 after the cell has been discharged.
Figure 28B:
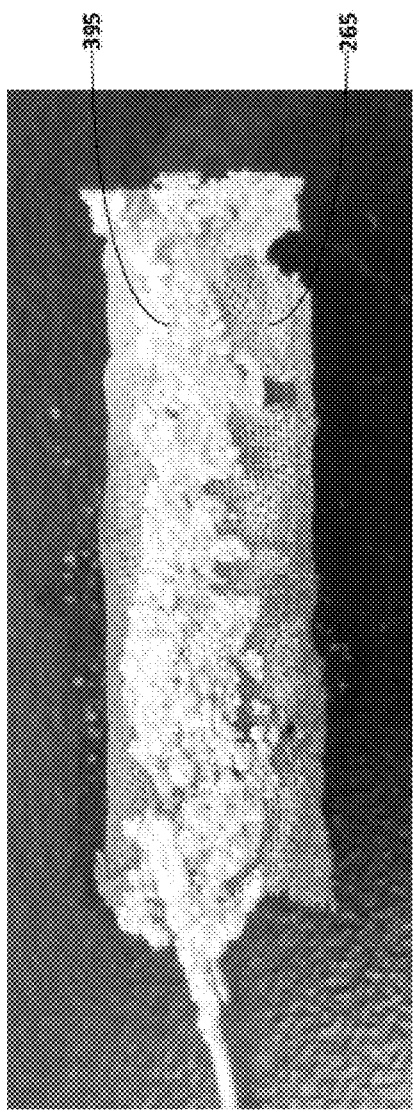
FIG. 28B shows a bottom perspective view of a representative embodiment of the mesh positive electrode of FIG. 25 after the cell has been discharged.

In a sixth example, a sixth Ucell 360 (shown partially in FIG. 25) was set up to contain a platinum mesh positive electrode 265 at the bottom of the positive electrode compartment 135, 2.5 M CuI in 9.5M NaI. Additionally, this cell, having 201 mAh capacity, was run at 130° C. at a 21 mA (15 mA/cm$^2$) charge/discharge. As this cell was tested, FIG. 26 shows cell potential against time during cycle life testing. FIG. 27 shows the capacity of the cathode during cycling, wherein line 365 represents a 1$^{st}$ charge, line 370 represents a 1$^{st}$ discharge, line 375 represents a 10$^{th}$ charge, line 380 represents a 10$^{th}$ discharge, line 385 represents a 20$^{th}$ charge, and line 390 represents a 20$^{th}$ discharge. Additionally, FIG. 24 shows that copper 395 tended to settle at the bottom of the positive electrode compartment 135. Similarly, FIGS. 28A and 28B show that the copper 395 tended to preferentially coat the bottom of the positive electrode 265 (shown in FIG. 28B) over the top of the positive electrode 265 (shown in FIG. 28A). As a result of the experiments run on this cell, it was found that after 20 cycles in 90 hours, in which the cell was discharged to 40% and then cycled between 40% and 60%, much of the platinum mesh as not coated with copper. It is believed that this uneven plating is an indication that the current fields were not ideal. In this regard, it has been found that copper may bind better to an electrode where the electrode surface has been prepared (e.g., the surface has been roughened). The plating will also improve by addition of plating agents and application of the proper current density to surface area is achieved, and the electrical field lines are evenly distributed.

While specific embodiments and examples of the present invention have been illustrated and described, numerous modifications come to mind without significantly departing from the spirit of the invention and the scope of protection is only limited by the scope of the accompanying claims.

The invention claimed is:

1. An alkali metal secondary cell, comprising:
an alkali metal negative electrode, which electrochemically oxidizes to release alkali metal ions during discharge and electrochemically reduces alkali metal ions to alkali metal during recharge, wherein the alkali metal negative electrode comprises a material selected from sodium metal and lithium metal;
a solvent;
a positive electrode compartment comprising a positive electrode disposed in a liquid positive electrode solution comprising:
a metal complex ion comprising a complex of a non-alkali metal ion and a chemical selected from (i) plurality of ions selected from halide ions and pseudo-halide ions, (ii) a chelating agent, and (iii) ammonia, wherein the metal complex ion has a concentration that is greater than 0.5 Molar; and
an alkali metal compound selected from an alkali metal halide and an alkali metal pseudo-halide, wherein the non-alkali metal ion from the metal complex ion electrochemically reduces to form non-alkali metal plating on the positive electrode during discharge, and wherein the non-alkali metal plating electrochemically oxidizes to form the non-alkali metal ion and the metal complex ion during recharge; and
an alkali metal ion conductive electrolyte membrane that separates the alkali metal negative electrode from the liquid positive electrode solution, wherein the alkali metal ion conductive electrolyte membrane is selected from a sodium ion conductive electrolyte membrane and a lithium ion conductive membrane
wherein the alkali metal secondary cell, during operation, has a discharge reaction represented by:

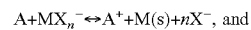

A+MX$_n^-$↔A$^+$+M(s)+nX$^-$, and a charge reaction represented by:

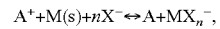

A$^+$+M(s)+nX$^-$↔A+MX$_n^-$, wherein A is the alkali metal, M is the non-alkali metal of the metal complex ion, X is a chemical selected from (i) plurality of ions selected from halide ions and pseudo-halide ions, (ii) a chelating agent, and (iii) ammonia.

2. The cell of claim 1, wherein the alkali metal negative electrode comprises sodium metal.

3. The cell of claim 1, wherein the alkali metal negative electrode comprises lithium metal.

4. The cell of claim 2, wherein the alkali metal ion conductive electrolyte membrane comprises a NaSICON-type material.

5. The cell of claim 3, wherein the alkali metal ion conductive electrolyte membrane comprises a LiSICON-type material.

6. The cell of claim 2, wherein the alkali metal compound comprises NaI.

7. The cell of claim 1, wherein the metal complex ion comprises the plurality of ions selected from halide ions and pseudo-halide ions, and such ions are selected from a chloride ion, bromide ion, iodide ion, azide ion, thiocyanate ion, and a cyanide ion.

8. The cell of claim 1, wherein the metal complex ion is selected from $CuI_2^-$, $AgI_2^-$, $[AlF_6]^{3-}$, $[AlF_4]^{-1}$, $[BeF_4]^{2-}$, $[SnF_6]^{2-}$, $[CuCl_2]^{-1}$, $[AgCl_2]^{-1}$, $[PbCl_4]^{2-}$, $[ZnCl_4]^{2-}$, $[HgCl_4]^{2-}$, $[CuBr_2]^{-1}$, $[AgBr_2]^{-1}$, $[HgBr_4]^{2-}$, $[CuI_2]^{-1}$, $[AgI_2]^{-1}$, $[PbI_4]^{2-}$, $[ZrI_5]^{-1}$, $[TiBr_5]^{-1}$, $[HgI_4]^{2-}$, and $[Cd(SCN)_4]^{2-}$, $[Hg(SCN)_4]^{2-}$.

9. The cell of claim 1, wherein the non-alkali metal ion is selected from ions of silver, aluminum, gold, bismuth, beryllium, cobalt, cadmium, chromium, copper, iron, zinc, gallium, mercury, magnesium, manganese, nickel, lead, titanium, vanadium, zirconium, niobium, molybdenum, tungsten, gallium, indium and tin.

10. The cell of claim 1, wherein the liquid positive electrode solution comprises the alkali metal halide or pseudohalide at a concentration that is greater than 0.5 Molar.

11. An alkali metal secondary cell, comprising:
    an alkali metal negative electrode, which electrochemically oxidizes to release alkali metal ions during discharge of the secondary cell and electrochemically reduces alkali metal ions to alkali metal during recharge of the secondary cell, wherein the alkali metal negative electrode comprises a material selected from sodium metal and lithium metal;
    a solvent;
    a positive electrode compartment comprising a positive electrode disposed in a liquid positive electrode solution comprising:
        a metal complex ion comprising a complex of a non-alkali metal ion and a chemical selected from (i) plurality of ions selected from halide ions and pseudo-halide ions, and (ii) a chelating agent, wherein the metal complex ion has a concentration that is greater than 0.5 Molar; and
    an alkali metal compound selected from an alkali metal halide, wherein the non-alkali metal ion from the metal complex ion electrochemically reduces to form metal plating on the positive electrode during discharge, and wherein the halide electrochemically oxidizes to form a halogen during recharge; and
    an alkali metal ion conductive electrolyte membrane that separates the alkali metal negative electrode from the liquid positive electrode solution, wherein the alkali metal ion conductive electrolyte membrane is selected from a sodium ion conductive electrolyte membrane and a lithium ion conductive membrane
    wherein the alkali metal secondary cell, during operation, has a discharge reaction represented by:

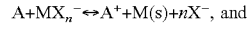
    $A + MX_n^- \leftrightarrow A^+ + M(s) + nX^-$, and a charge reaction represented by:

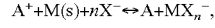
    $A^+ + M(s) + nX^- \leftrightarrow A + MX_n^-$, wherein A is the alkali metal, M is the non-alkali metal of the metal complex ion, X is a chemical selected from (i) plurality of ions selected from halide ions and pseudo-halide ions and (ii) a chelating agent.

12. The cell of claim 11, wherein during recharge the halogen oxidizes the metal plating to reform the metal complex ion.

* * * * *